(12) United States Patent
Ghazi et al.

(10) Patent No.: US 12,181,424 B1
(45) Date of Patent: Dec. 31, 2024

(54) METHOD AND APPARATUS OF STATIONARY-SOURCE NONPLANAR-TRAJECTORY NARROW-BEAM COMPUTED TOMOGRAPHY

(71) Applicant: MALCOVA, INC., Newark, CA (US)

(72) Inventors: Peymon Mirsaeid Ghazi, Berkeley, CA (US); Tara Reneé Ghazi, Berkeley, CA (US); Michael Hyon-Min Kim, Menlo Park, CA (US); Erik William Chell, Oakland, CA (US)

(73) Assignee: MALCOVA, Inc., Newark, CA (US)

( * ) Notice: Subject to any disclaimer, the term of this patent is extended or adjusted under 35 U.S.C. 154(b) by 0 days.

(21) Appl. No.: 18/783,259

(22) Filed: Jul. 24, 2024

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/316* (2013.01); *G01N 2223/3301* (2013.01); *G01N 2223/50* (2013.01)

(58) Field of Classification Search
CPC ............... G01N 23/046; G01N 23/083; G01N 2223/316; G01N 2223/3301; G01N 2223/50; A61B 6/03; A61B 6/482; A61B 6/4241; A61B 6/0435; A61B 6/4007; A61B 6/4078; A61B 6/4452; A61B 6/502; A61B 6/032
See application file for complete search history.

(56) References Cited

U.S. PATENT DOCUMENTS

| | | |
|---|---|---|
| 4,145,610 A | 3/1979 | Perilhou |
| 4,190,773 A | 2/1980 | Braden et al. |
| 4,315,146 A | 2/1982 | Rudin |
| 4,403,338 A | 9/1983 | Rudin et al. |
| 4,975,933 A | 12/1990 | Hampel |

(Continued)

FOREIGN PATENT DOCUMENTS

| | | |
|---|---|---|
| JP | H0638957 A | 2/1994 |
| JP | H09149898 A | 6/1997 |

(Continued)

OTHER PUBLICATIONS

EP Application No. 20853236.6 Extended European Search Report mailed Jun. 27, 2022.

(Continued)

*Primary Examiner* — Courtney D Thomas
(74) *Attorney, Agent, or Firm* — WILSON SONSINI GOODRICH & ROSATI

(57) ABSTRACT

Described herein are X-ray-based CT systems, specifically those with a stationary X-ray source and a moving object of interest, and methods of using the same, that address limitations in current stationary-source CT, such as scatter contamination and limited scan trajectories. The described systems include a pre-object collimator to form a narrow beam. Scatter contamination is reduced to less than 5% of acquired projections, resulting in high-quality CT images with minimal artifacts, improving diagnostic accuracy and (Continued)

measurement precision. The described system also allows for nonplanar trajectories, providing complete sampling of an object along multiple degrees of freedom.

30 Claims, 20 Drawing Sheets

(56) References Cited

U.S. PATENT DOCUMENTS

| | | | |
|---|---|---|---|
| 5,966,422 | A | 10/1999 | Dafni et al. |
| 6,438,210 | B1 | 8/2002 | Castleberry |
| 6,744,852 | B2 | 6/2004 | Klotz et al. |
| 6,990,171 | B2 | 1/2006 | Toth et al. |
| 7,088,799 | B2 | 8/2006 | Hoffman |
| 8,199,883 | B2 | 6/2012 | Arenson et al. |
| 8,325,879 | B2 | 12/2012 | Loos et al. |
| 9,208,918 | B2 | 12/2015 | Tybinkowski et al. |
| 9,392,984 | B2 | 7/2016 | Pelc et al. |
| 10,531,844 | B1 | 1/2020 | Ghazi et al. |
| 11,622,735 | B1* | 4/2023 | Ghazi .................. A61B 6/4452 378/4 |
| 2005/0013411 | A1 | 1/2005 | Yahata et al. |
| 2009/0080604 | A1 | 3/2009 | Shores et al. |
| 2011/0013742 | A1 | 1/2011 | Zaiki et al. |
| 2014/0098930 | A1 | 4/2014 | Litzenberger et al. |
| 2015/0279496 | A1 | 10/2015 | Bauer |
| 2016/0035450 | A1 | 2/2016 | Date et al. |
| 2016/0081636 | A1 | 3/2016 | Kremer et al. |
| 2018/0317867 | A1 | 11/2018 | Boone et al. |
| 2020/0253567 | A1* | 8/2020 | Ghazi .................. A61B 6/032 |

FOREIGN PATENT DOCUMENTS

| | | |
|---|---|---|
| JP | 2019010443 A | 1/2019 |
| WO | WO-2014058775 A1 | 4/2014 |
| WO | WO-2016126829 A1 | 8/2016 |
| WO | WO-2017073996 A1 | 5/2017 |
| WO | WO-2018165285 A1 | 9/2018 |
| WO | WO-2021030192 A1 | 2/2021 |

OTHER PUBLICATIONS

Ghazi et al.: A fluence modulation and scatter shielding apparatus for dedicated breast CT: Theory of operation. Med Phys. 47(4):1590-1608 doi:10.1002/mp.14026 (2020).

Ghazi: Reduction of scatter in breast CT yields improved microcalcification visibility. Phys Med Biol. 65(23):235047:1-21 doi:10.1088/1361-6560/abae07 (2020).

PCT/US2020/017760 International Search Report and Written Opinion dated May 4, 2020.

PCT/US2020/045415 International Preliminary Report on Patentability dated Feb. 17, 2022.

PCT/US2023/035088 International Search Report and Written Opinion dated Nov. 7, 2023.

U.S. Appl. No. 17/970,158 Non-Final Office Action dated Jan. 6, 2023.

U.S. Appl. No. 16/557,321 Office Action dated May 28, 2020.

* cited by examiner

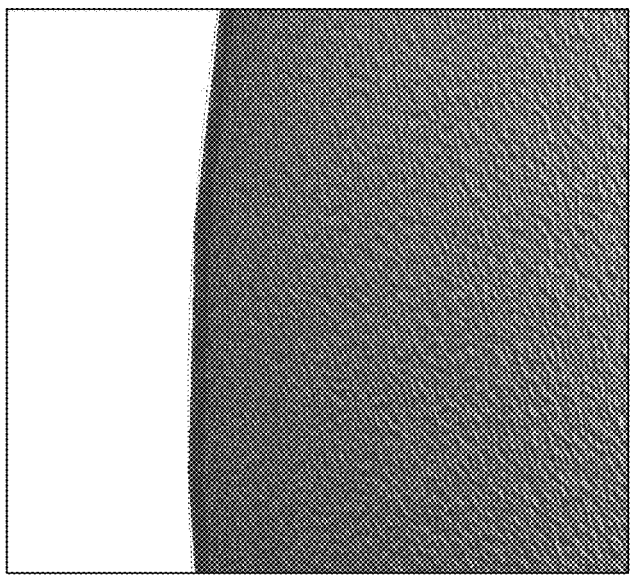
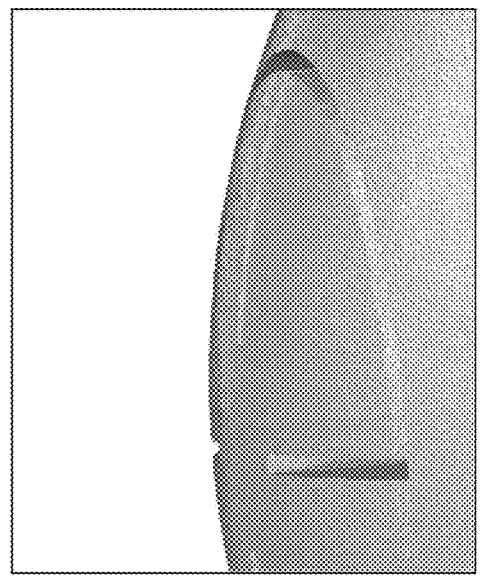
FIG. 17A                            FIG. 17B

METHOD AND APPARATUS OF STATIONARY-SOURCE NONPLANAR-TRAJECTORY NARROW-BEAM COMPUTED TOMOGRAPHY

BACKGROUND

Computed tomography (CT) is an imaging modality used for measuring the internal areas of an object using X-ray equipment, special image acquisition techniques and image reconstruction methods.

TECHNICAL FIELD

The present disclosure relates to an apparatus and methods for X-ray computed tomography of an object.

SUMMARY

The subject matter described herein relates to X-ray-based CT systems. More specifically, this described subject matter focuses on a specific type of X-ray-based CT where the X-ray source is kept stationary, while the object of interest moves along a predefined trajectory. These systems are commonly used for non-destructive testing and evaluation of materials and objects.

X-ray-based tomographic imaging refers to methods of measuring an object from different views using X-rays. FIG. 1 provides a visual representation. Here, X-rays are generated in at least one X-ray source 101, such as an X-ray tube. The generated X-ray beam has a non-zero fan angle 102 and a non-zero cone angle 103. The fan and cone angles of the X-ray sources used in stationary-source applications are typically less than 30 degrees. The X-rays interact with the object of interest 104 that is placed within the imaging system's field of view. X-rays that exit the object can be captured using at least one X-ray detector unit 105. For example, in Micro CT systems, a high-resolution flat panel X-ray detector is used as the imager, positioned opposite to the X-ray source at the other side of the object, as shown in FIG. 1. During an exposure, the recorded data in the X-ray detector is referred to as a projection. During a CT scan, many projections are acquired as the object is measured from different view angles. This process is referred to as CT image acquisition.

Regardless of the mechanism through which a CT image acquisition is performed, the resulting projections have a lower dimensionality than the object of interest. For example, in the setup shown in FIG. 1, projections carry information about the three-dimensional object 104 in two-dimensional images acquired by the detector 105. Therefore, image acquisition is always followed by a computerized methodology to reconstruct a digital image that represents the object of interest. This process is referred to as image reconstruction. What results from a CT image reconstruction process is a three-dimensional image that provides information about the material and textural complexity of the object. Therefore, X-ray CT can be thought of as a two-step process: a) image acquisition, where the information is encoded into projections, and b) image reconstruction, where the encoded information is decoded via image reconstruction. The focus of this disclosure is on the first step of this two-step process: X-ray CT image acquisition. Several aspects of the described subject matter address limitations of the current state-of-the-art stationary source CT in the encoding of information during image acquisition.

While in radiological CT systems, the X-ray source and detector rotate about an often-stationary object of interest, in the current state-of-the-art stationary-source CT systems, image acquisition occurs when the object of interest rotates about an axis between a stationary source and stationary detector. This design architecture leads to several major limitations: a) a stationary detector requires a large sensitive area to measure the object which, inadvertently, leads to the acquisition of projections that are contaminated by scattered radiation, and b) the recorded data in the projections carries insufficient information about the object, leading to image artifacts in the reconstructed images. Each of these limitations are discussed separately in the following.

Scatter Contamination

During a CT image acquisition, X-rays interact with the object in different ways. FIG. 2 provides a visual representation of these interactions. In X-ray CT, X-rays 201-203 that are generated by at least one X-ray source 204 move towards the object of interest 205. Some X-rays 201 transition through the object without undergoing any interaction. These X-ray photons are commonly referred to as the primary photons. Some photons 202 may be completely stopped in the object through the photoelectric absorption mechanism. During photoelectric absorption, the entire energy of the X-ray photon is deposited in the object 205. Unlike the primary or absorbed photons, some photons 203 can undergo scatter events. The scattered photons may or may not deposit energy in the object, but an underlying property of the scatter interaction is that the trajectory of the scattered photon 203, as it leaves the object 205, is different from its trajectory prior to entering the object. The scattered photons may reach the X-ray detector 206. Therefore, in the state-of-the-art stationary CT systems, the acquired projections in the detector are formed of both primary and scattered photons.

X-ray scattering is entirely a stochastic event, meaning that it is impossible to predict, prior to the scattering event, either the exact level of energy deposition to the object of interest during a scatter event, or the exact trajectory of the photon after the event. Therefore, if an X-ray photon reaches the X-ray detector, it is practically impossible to postulate the exact location of the scatter event within the object of interest. In short, acquisition of scattered X-rays results in contamination of raw data. In X-ray CT, the proportion of raw data that consists of scattered X-rays can vary depending on several factors, such as the type of CT system, the scanning protocol, and size and material composition of the object. In diagnostic CT, for instance, the scattered data typically 20% to 40% of the entire data that the detector receives.

Scatter contamination has several unwanted implications, some of which cannot be remedied. For example, acquisition of scattered photons degrades the contrast resolution of the CT image throughout the frequency response of the imaging system. While negative impacts, such as low-spatial-frequency (or slow moving) shading artifacts, can be partially remedied using mathematical and computer algorithms, the high-spatial-frequency impacts cannot. Most deleterious is the loss in the visibility of small, or low-contrast, features of the object in the resulting CT image. Therefore, the most effective approach in handling scatter contamination is one of avoidance-proactive prevention of scattered photons from being detected during CT image acquisition.

A small number of system-level efforts to employ such a strategy do exist, but inadvertently result in negative side effects. One such approach, for example, is via geometrically increasing the distance between the object and the detector. This can be employed in an effort to reduce the likelihood of scattered photon acquisition by providing an increase in the space unoccupied by the detector for such photons to pass through. Such a solution, however, results in the undesirable consequence of a loss in spatial resolution due to amplification of focal spot blurring. Another strategy might be to employ filtration. Filters placed between the source and object, such as dynamic or bowtie filters, can reduce the number of incident photons on the object which consequently may reduce the likelihood or number of total scatter events and, subsequently, scatter acquisition. A negative outcome of this strategy, however, is inconsistency in the intensity of the incident X-ray beam on the object. This results because some regions of the beam are filtered differently than the other parts. A separate approach to prevent scatter contamination involves the employment of anti-scatter grids. Such an approach results in added technical challenges such as introduction of septal shadow to projections, as well as an increased radiation dose penalty. The dose penalty is commonly associated with the use of anti-scatter grids. This option is also undesirable in many applications.

Limited Scan Trajectory

Another major shortcoming of stationary source CT solutions in the existing art is that of limited possible scan trajectories. In state-of-the-art stationary source CT systems, as illustrated in FIG. 3, an object of interest 301 is often placed on a turntable between the source 302 and detector 303. Rotation of the turntable leads to the rotation of the object along the turntable's axis of rotation 304. In CT, there is a well-established criterion for image reconstruction (commonly referred to as the Tuy's sufficiency condition) stating that only the points along the plane of scan trajectory can be fully reconstructed. In the setup shown in FIG. 3, these points belong to a plane 305 that is orthogonal to the object's axis of rotation 304. Therefore, regardless of the distance 306 between the source and detector, only one image segment 307 can be fully reconstructed, meaning that often the vast majority of the voxels of a CT image are reconstructed without satisfying the sampling criterion.

Not satisfying Tuy's sufficiency criterion can lead to incomplete data acquisition. This means that, regardless of the number of projections, some parts of the object cannot be completely measured. Therefore, the raw data cannot be fully representative of the entire object, which leads to inhomogeneities is measuring different parts of the object.

The abovementioned inadequate sampling can be represented in the resulting CT image with varying levels of artifacts, such as streak artifacts, blurring, or distortions. Streak artifacts occur when the data from some regions are missing or not properly sampled, leading to low-contrast, yet discernible, lines (streaks) in the image. Incomplete sampling can also cause blurring of fine details within the image. Moreover, parts of the image may appear distorted due to uneven sampling.

The magnitude of these artifacts gets amplified with an increase in the cone angle of the generated beam, meaning that the problem worsens in image segments that are further from the normal plane of imaging. These artifacts are commonly referred to as cone-beam artifacts. In geometry shown in FIG. 3, all image segments suffer from cone-beam artifacts, except the one 307 that belongs to the normal plane.

In clinical and pharmaceutical settings, such a loss of image quality can lead to the deterioration of the diagnostic accuracy. An example is in small animal imaging. Small animal models, such as mice and rats, are commonly used in pharmaceutical research settings to evaluate the therapeutic efficacy of new drug candidates before progressing to human trials. Micro CT systems are commonly used in this field. However, cone-beam artifacts in imaging of small animals can lead to missed diagnoses, because small or subtle pathologies may not be visible or accurately represented in the resulting CT images. On the other hand, the missed diagnoses, if detected, frequently trigger a need for repeat scans, which are associated with increased costs and additional radiation exposure to the model. The added dose can impact the accuracy of the pharmaceutical analysis in certain applications.

Another example is in non-destructive testing and evaluation applications, where X-ray CT is used in different settings, such as manufacturing inspections, material decomposition and characterization, and evaluation of adaptive manufacturing. In these cases, cone-beam artifacts can, and often do, result in inaccuracies in quantitative measurements such as material density or the size and localization of defects in an object.

The abovementioned limitations are overcome by the subject matter described herein. Described are systems of stationary-source nonplanar-trajectory X-ray-based CT and methods of performing computed tomography (CT) to image an object of interest using the same.

An aspect of the present disclosure focuses on avoiding the acquisition of scattered photons during image acquisition. According to different embodiments, the systems and methods of imaging lead to acquired projections that contain less than 5% scattered X-rays. Multiple embodiments of the subject matter described herein use a collimator. The objective of the pre-object collimation is to form a narrow beam before it reaches a narrow detector. The collimator that forms such a beam is referred to hereinafter as the pre-object collimator, because it is placed between the X-ray source and the object. The resulting beam is referred to hereinafter as the narrow beam. The narrow beam is defined as a rectangular beam with one side at least an order of magnitude larger than the other side. For example, using the fan angle and cone angle definitions introduced in FIG. 1, a horizontal narrow beam is defined as a beam with a fan angle coverage at least an order of magnitude larger than its cone angle coverage. Similarly, a vertical narrow beam is defined as a beam with a cone angle coverage at least an order of magnitude larger than its fan angle coverage.

In some embodiments of the described subject matter, the narrow beam, after transitioning through the object, is detected by a narrow-field detector. Similar to the narrow beam, the narrow-field detector has an X-ray sensitive area that is substantially narrower in one direction compared to the other. To put it concretely, similar to the narrow beam, the sensitive area of the narrow-field detector has a coverage that is at least an order of magnitude smaller on one side than the other side. If such a narrow-field detector is kept stationary, such a limited size detector can be only used to measure a small portion of the imaging system's field-of-view. Therefore, in subject matter described herein, a method of imaging is introduced that oscillates the narrow-field detector along an arc. During this oscillatory translation, the X-rays are emitted, therefore, the entire field-of-view of the imaging system can be measured. Moreover, the movement of the narrow-field detector is completely synchronized with the movement of the pre-object collimator; thus, the pre-object collimator's opening oscillates on an arc. As a result, the photons that transition through the object are incident on the sensitive area of the narrow-field detector.

In yet other embodiments, the narrow beam is acquired by a detector with a large coverage area, such as the detectors shown in FIGS. 1 and 2. This type of detector is referred to hereinafter as the wide-field detector. Unlike the narrow-field detector introduced herein, the sensitive area of a wide-field detector is large enough to measure the entire field-of-view during an exposure. However, the extensive coverage of such detector results in capturing scattered X-rays (see FIG. 2). Therefore, a physical structure and a method of imaging are introduced to prevent scattered photons from reaching the detector. The physical structure consists of two sheets and is placed between the object and the wide-field detector. This structure is referred to hereinafter as the post-object collimator because it is located between the object and the wide-field detector. The role of the post-object collimator is to prevent scattered photons from reaching the wide-field detector. Similar to the pre-object collimator, an opening is formed between the sheets of the post-object collimator to allow the narrow beam to reach the wide-field detector.

Using the presently described subject matter, the X-rays received on the X-ray detector are almost entirely composed of primary photons, regardless of whether the detector is a narrow-field detector or a wide-field detector. More explicitly, the ratio of acquired scattered photons to acquired primary photons is less than 0.05. Therefore, the acquired projections contain less than 5% scattered X-rays. As a result, the resulting CT image does not suffer from the negative impacts of scatter uptake during image acquisition.

Moreover, the subject matter described herein resolves the limitations in the trajectory of the object's motion within the field-of-view. This is accomplished via a physical structure that articulates the positioning of the object of interest. According to various embodiments of the present subject matter, the structure can translate and rotate the object along up to six degrees of freedom.

Accordingly, in one aspect, described herein are stationary-source computed tomography (CT) systems comprising: a stationary X-ray source configured to generate a beam of X-ray photons; a pre-object collimator positioned between the stationary X-ray source and an object of interest and comprising an opening configured to oscillate on a first translational arc having a first center of oscillation; a narrow-field X-ray detector configured to oscillate on a second translational arc having a second center of oscillation; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the narrow-field X-ray detector from the second center of oscillation, and $D_2$ is a distance of the stationary X-ray source from the second center of oscillation; a structure configured to articulate the position of the object of interest between the pre-object collimator and the narrow-field X-ray detector within a field of view and move the object of interest on a nonplanar trajectory; and a controller configured to perform at least the following operations: oscillating the opening of the pre-object collimator on the first translational arc with less than 360 degrees rotation; oscillating the narrow-field X-ray detector on the second translational arc with less than 360 degrees rotation; synchronizing a speed and a phase for the oscillatory translation of the narrow-field X-ray detector with the opening of the pre-object collimator; and moving the object of interest on the nonplanar trajectory within the field of view during an image acquisition. In such embodiments, the positioning of the X-ray source remains unchanged during the image acquisition. In some embodiments, the beam of X-ray photons is a narrow beam. In further embodiments, the narrow beam of X-ray photons is a horizontal narrow beam with a fan angle at least an order of magnitude larger than a cone angle or a vertical narrow beam with a cone angle at least an order of magnitude larger than a fan angle. In some embodiments, the narrow-field X-ray detector comprises an X-ray sensitive area that is at least an order of magnitude narrower in a first dimension versus a second dimension perpendicular to the first dimension. In some embodiments, the system further comprises a chassis and wherein one or more of: the stationary X-ray source, the pre-object collimator, the narrow-field X-ray detector, and the structure configured to articulate the position of the object of interest are affixed, directly or indirectly, to the chassis. In some embodiments, the system is configured to image an anatomical object of interest. In other embodiments, the system is configured to image a non-anatomical object of interest. In some embodiments, the oscillation of the opening of the pre-object collimator is continuous during the image acquisition. In some embodiments, the oscillation of the narrow-field X-ray detector is continuous during the image acquisition. In further embodiments, the operations further comprise activating the stationary X-ray source to generate the continuous x-ray exposure during the image acquisition. In some embodiments, the oscillation of the narrow-field X-ray detector is stepwise during the image acquisition. In further embodiments, the operations further comprise activating and deactivating the stationary X-ray source to generate a pulsed X-ray exposure during the image acquisition. In still further embodiments, the X-ray source is activated during each oscillation of the pre-object collimator and the narrow-field X-ray detector and deactivated between each oscillation of the pre-object collimator and the narrow-field X-ray detector. In still further embodiments, the object of interest is moved on the nonplanar trajectory within the field of view during between each oscillation of the pre-object collimator and the narrow-field X-ray detector. In some embodiments, the image acquisition comprises a predefined number of projections. In further embodiments, the synchronization is such that the collimated beam of X-ray photons is continuously incident on the X-ray sensitive area of the narrow-field X-ray detector during each projection. In various embodiments, the structure is configured to articulate the position of the object of interest and move the object of interest with two or three translational degrees of freedom and two or three rotational degrees of freedom. In some embodiments, the system comprises a plurality of pre-object collimators and a plurality of narrow-field X-ray detectors, each pre-object collimator corresponding to a narrow-field X-ray detector, and wherein the operations comprise synchronizing a speed and a phase for the oscillatory translation of each corresponding collimator/detector pair. In preferred embodiments, the beam of X-ray photons incident on the narrow-field X-ray detector comprises less than 5% scattered photons.

In another aspect, described herein are methods of performing computed tomography (CT) to image an object of interest comprising: generating, at a stationary X-ray source, a beam of X-ray photons; oscillating an opening of a pre-object collimator, the pre-object collimator positioned between the stationary X-ray source and an object of interest, the opening configured to oscillate on a first translational arc having a first center of oscillation, and the oscillation on the first translational arc having less than 360 degrees rotation; oscillating a narrow-field X-ray detector, the narrow-field X-ray detector configured to oscillate on a second translational arc having a second center of oscillation, and the oscillation on the second translational arc having less than 360 degrees rotation; synchronizing a speed and a phase for the oscillatory translation of the narrow-field X-ray detector with the opening of the pre-object collimator; positioning of the object of interest between the pre-object collimator and the narrow-field X-ray detector within a field of view; and moving the object of interest on a nonplanar trajectory during an image acquisition; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the narrow-field X-ray detector from the second center of oscillation, and $D_2$ is a distance of the stationary X-ray source from the second center of oscillation. In such embodiments, the positioning of the X-ray source remains unchanged during the image acquisition. In some embodiments, the beam of X-ray photons is a narrow beam. In further embodiments, the narrow beam of X-ray photons is a horizontal narrow beam with a fan angle at least an order of magnitude larger than a cone angle or a vertical narrow beam with a cone angle at least an order of magnitude larger than a fan angle. In some embodiments, the narrow-field X-ray detector comprises an X-ray sensitive area that is at least an order of magnitude narrower in a first dimension versus a second dimension perpendicular to the first dimension. In some embodiments, one or more of: the stationary X-ray source, the pre-object collimator, and the narrow-field X-ray detector are affixed, directly or indirectly, to a chassis. In some embodiments, the object of interest is an anatomical object of interest. In other embodiments, the object of interest is non-anatomical object of interest. In some embodiments, the oscillation of the opening of the pre-object collimator is continuous during the image acquisition. In some embodiments, the oscillation of the narrow-field X-ray detector is continuous during the image acquisition. In some embodiments, the method further comprises activating the stationary X-ray source to generate the continuous x-ray exposure during the image acquisition. In some embodiments, the oscillation of the narrow-field X-ray detector is stepwise during the image acquisition. In further embodiments, the method further comprises activating and deactivating the stationary X-ray source to generate a pulsed X-ray exposure during the image acquisition. In still further embodiments, the X-ray source is activated during each oscillation of the pre-object collimator and the narrow-field X-ray detector and deactivated between each oscillation of the pre-object collimator and the narrow-field X-ray detector. In still further embodiments, the object of interest is moved on the nonplanar trajectory within the field of view during between each oscillation of the pre-object collimator and the narrow-field X-ray detector. In some embodiments, the image acquisition comprises a predefined number of projections. In further embodiments, the synchronization is such that the collimated beam of X-ray photons is continuously incident on the X-ray sensitive area of the narrow-field X-ray detector during each projection. In some embodiments, the method utilizes a plurality of pre-object collimators and a plurality of narrow-field X-ray detectors, each pre-object collimator corresponding to a narrow-field X-ray detector, and wherein the method further comprises synchronizing a speed and a phase for the oscillatory translation of each corresponding collimator/detector pair. In various embodiments, the positioning and the moving the object of interest is with two or three translational degrees of freedom and two or three rotational degrees of freedom. In preferred embodiments, the beam of X-ray photons incident on the narrow-field X-ray detector comprises less than 5% scattered photons.

In another aspect, described herein are stationary-source and stationary-detector computed tomography (CT) systems comprising: a stationary X-ray source configured to generate a beam of X-ray photons; a pre-object collimator positioned between the stationary X-ray source and an object of interest and comprising an opening configured to oscillate on a first translational arc having a first center of oscillation; a stationary wide-field X-ray detector configured to acquire X-ray photons; a post-object collimator positioned between the object of interest and the stationary wide-field X-ray detector, comprising an opening configured to oscillate on a second translational arc having a second center of oscillation; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the opening of the post-object collimator from the second center of oscillation, and $D_2$ is a distance of the stationary X-ray source from the second center of oscillation; a structure configured to articulate the position of the object of interest between the pre-object collimator and the post-object collimator within a field of view and move the object of interest on a nonplanar trajectory; and a controller configured to perform at least the following operations: oscillating the opening of the pre-object collimator on the first translational arc with less than 360 degrees rotation; oscillating the opening of the post-object collimator on the second translational arc with less than 360 degrees rotation; synchronizing a speed and a phase for the oscillatory translation of the opening of the post-object collimator with the opening of the pre-object collimator; and moving the object of interest on the nonplanar trajectory within the field of view during an image acquisition. In such embodiments, the positioning of the X-ray source and the wide-field X-ray detector remain unchanged during the image acquisition. In some embodiments, the beam of X-ray photons is a narrow beam. In further embodiments, the narrow beam of X-ray photons is a horizontal narrow beam with a fan angle at least an order of magnitude larger than a cone angle or a vertical narrow beam with a cone angle at least an order of magnitude larger than a fan angle. In some embodiments, the system further comprises a chassis and wherein one or more of: the stationary X-ray source, the pre-object collimator, the post-object collimator, and the wide-field X-ray detector, and the structure configured to articulate the position of the object of interest are affixed, directly or indirectly, to the chassis. In some embodiments, the system is configured to image an anatomical object of interest. In other embodiments, the system is configured to image a non-anatomical object of interest. In some embodiments, the image acquisition comprises a predefined number of projections. In some embodiments, the synchronization is such that the collimated beam of X-ray photons is continuously incident on the X-ray sensitive area of the wide-field X-ray detector during each projection. In some embodiments, the system comprises a plurality of pre-object collimators and a plurality of post-object collimators, each pre-object collimator corresponding to a post-object collimator, and wherein the operations comprise synchronizing a speed and a phase for the oscillatory translation of each corresponding collimator pair. In various embodiments, the structure is configured to articulate the position of the object of interest and move the object of interest with two or three translational degrees of freedom and two or three rotational degrees of freedom. In preferred embodiments, the beam of X-ray photons incident on the wide-field X-ray detector comprises less than 5% scattered photons.

In yet another aspect, described herein are methods of performing computed tomography (CT) to image an object of interest comprising: generating, at a stationary X-ray source, a beam of X-ray photons; oscillating an opening of a pre-object collimator, the pre-object collimator positioned between the stationary X-ray source and an object of interest, the opening configured to oscillate on a first translational arc having a first center of oscillation, and the oscillation on the first translational arc having less than 360 degrees rotation; oscillating an opening of a post-object collimator, the post-object collimator positioned between the object of interest and a stationary wide-field X-ray detector, the opening configured to oscillate on a second translational arc having a second center of oscillation, and the oscillation on the second translational arc having less than 360 degrees rotation; synchronizing a speed and a phase for the oscillatory translation of the opening of the post-object collimator with the opening of the pre-object collimator; positioning the object of interest between the pre-object collimator and the and the post-object collimator within a field of view; and moving the object of interest on a nonplanar trajectory during an image acquisition; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the opening of the post-object collimator from the second center of oscillation, and $D_2$ is a distance of the stationary X-ray source from the second center of oscillation. In such embodiments, the positioning of the X-ray source and the wide-field X-ray detector remain unchanged during the image acquisition. In some embodiments, the beam of X-ray photons is a narrow beam. In further embodiments, the narrow beam of X-ray photons is a horizontal narrow beam with a fan angle at least an order of magnitude larger than a cone angle or a vertical narrow beam with a cone angle at least an order of magnitude larger than a fan angle. In some embodiments, one or more of: the stationary X-ray source, the pre-object collimator, post-object collimator, and the wide-field X-ray detector, are affixed, directly or indirectly, to a chassis. In some embodiments, the object of interest is an anatomical object of interest. In other embodiments, the object of interest is non-anatomical object of interest. In some embodiments, the image acquisition comprises a predefined number of projections. In further embodiments, the synchronization is such that the collimated beam of X-ray photons is continuously incident on the X-ray sensitive area of the wide-field X-ray detector during each projection. In some embodiments, the method utilizes a plurality of pre-object collimators and a plurality of post-object collimators, each pre-object collimator corresponding to a post-object collimator, and wherein the method further comprises synchronizing a speed and a phase for the oscillatory translation of each corresponding collimator pair. In various embodiments, the positioning and the moving the object of interest is with two or three translational degrees of freedom and two or three rotational degrees of freedom. In preferred embodiments, the beam of X-ray photons incident on the narrow-field X-ray detector comprises less than 5% scattered photons.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 17A and 17B show two different designs for the wall of the object holder's carriage;

DETAILED DESCRIPTION

Figure 1:
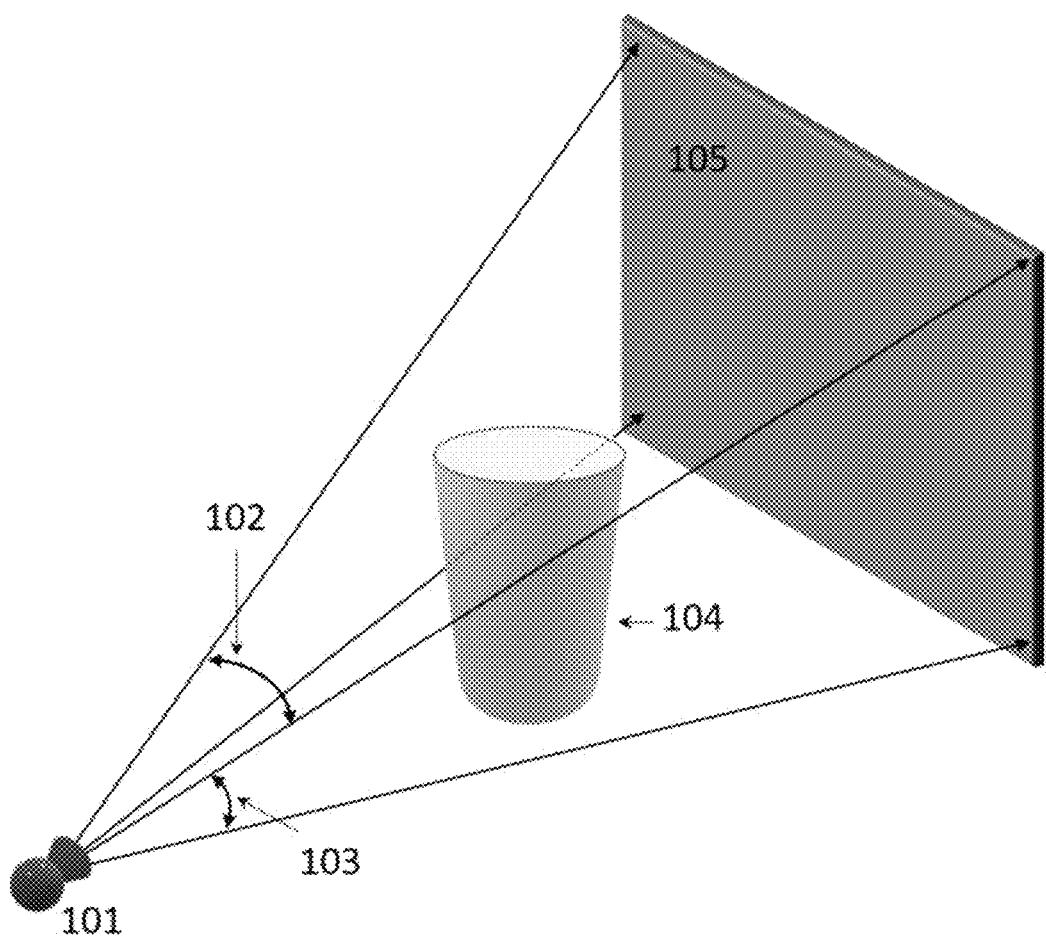
FIG. 1 is a perspective view of the art stationary source CT systems, introducing the basic principles of image acquisition, as well as the fan and cone angles of the sourced X-ray beam.
Figure 2:
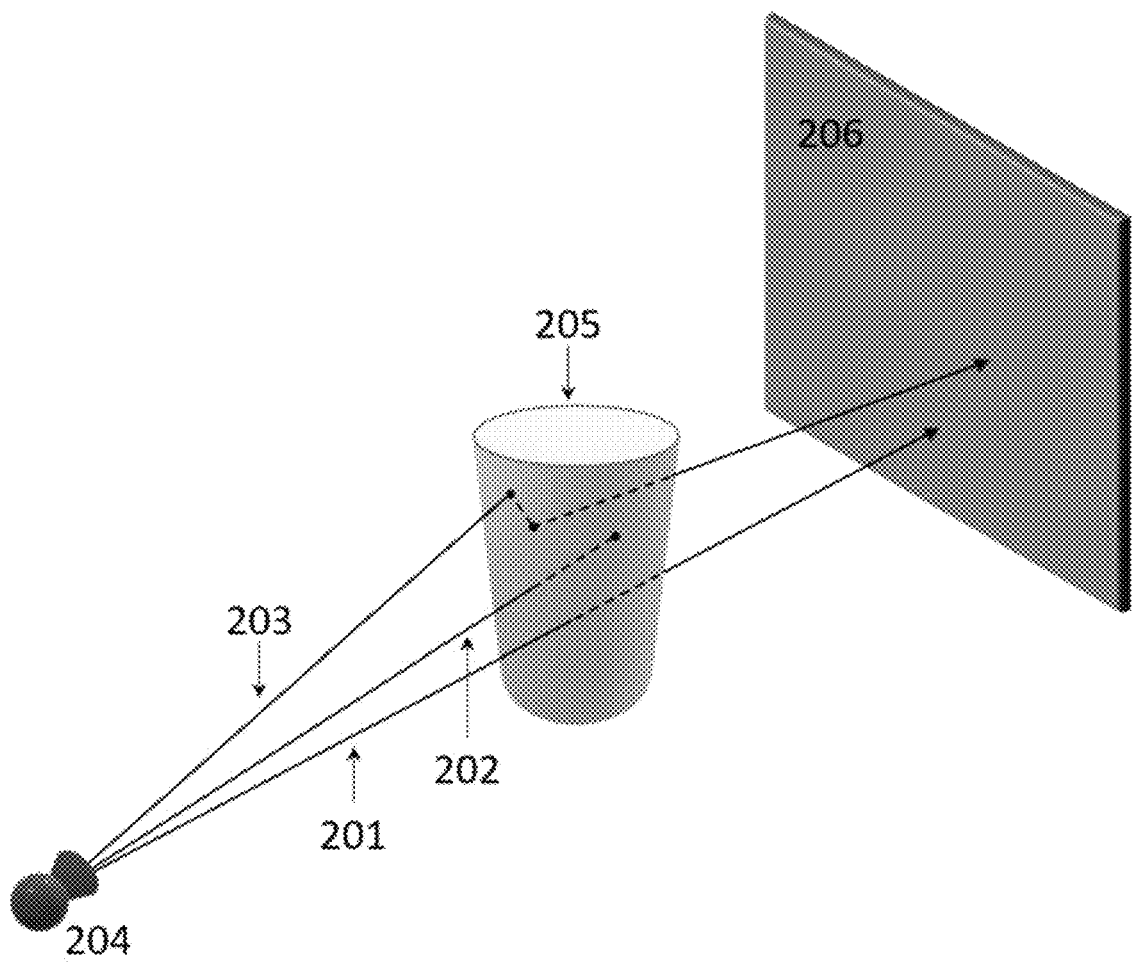
FIG. 2 is another perspective view of the art stationary source CT systems, describing different types of X-ray interaction with an object.
Figure 3:
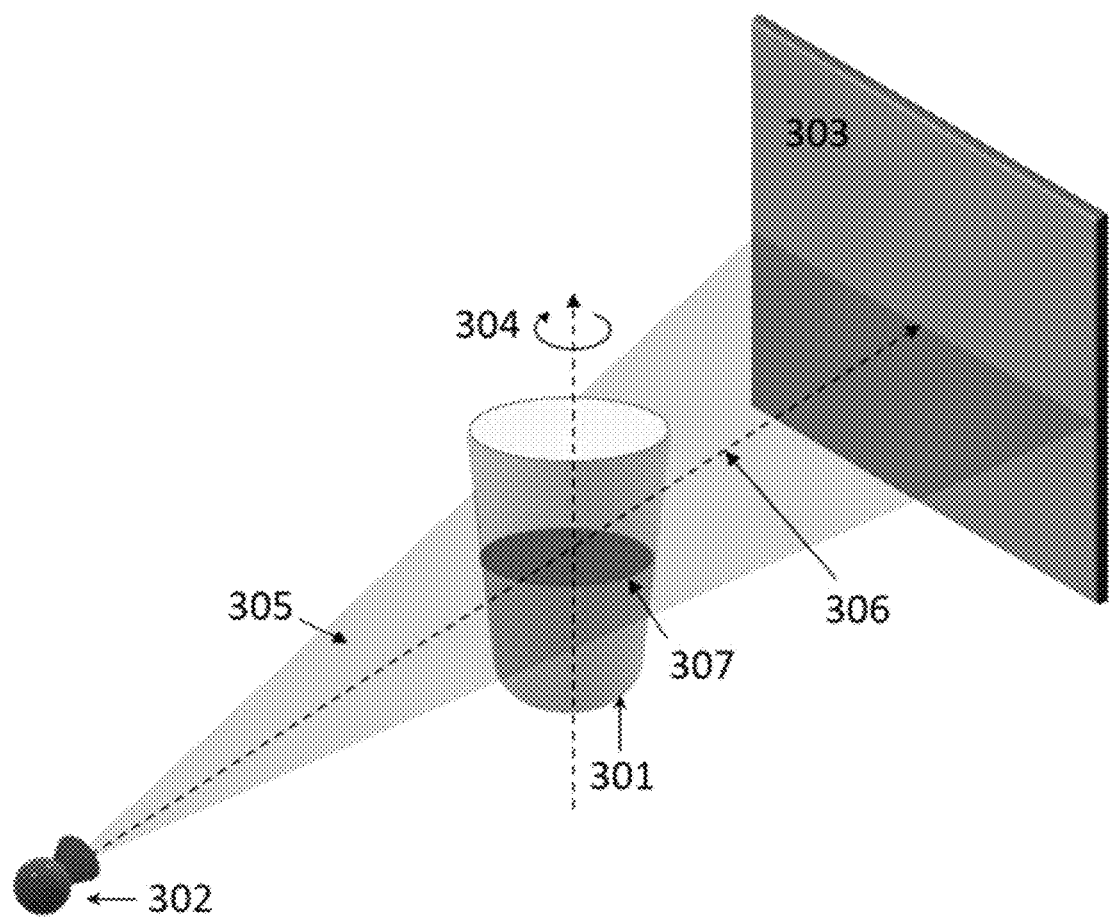
FIG. 3 is another perspective view of the art stationary source CT systems, describing the section of the object that can satisfy the Tuy's sampling criterion.

Described herein, in certain embodiments, are stationary-source CT systems comprising: a) at least one X-ray source, where the positioning of each X-ray source remains unchanged during an image acquisition; b) at least one narrow-field X-ray detector, where the positioning of each narrow-field detector changes continuously along an oscillatory translational arc; c) at least one pre-object collimator, where each pre-object collimator is positioned between an X-ray source and the object of interest, and each pre-object collimator has an opening that has a continuously oscillatory translational movement along an arc; and d) an object holder assembly capable of translating in three dimensional space, and rotating about three axes of rotation during an image acquisition.

Also, described herein, in certain embodiments, are methods of performing CT image acquisition comprising: a) positioning the object of interest using translational and rotational degrees of freedom during an image acquisition; b) generating an X-ray beam at each X-ray source, and collimating the generated beam into a narrow beam; c) moving each pre-object collimator's opening along an oscillatory translational arc with an axis of oscillation that is between the X-ray source and the object; d) moving each narrow-field detector along an oscillatory translational arc; and e) synchronizing the oscillatory translation speed and phase of the narrow-field detector to those of the corresponding pre-object collimator such that the generated narrow beam is detected in the sensitive area of the narrow-field detector.

Also described herein, in certain embodiments, are stationary-source CT systems comprising: a) at least one X-ray source, where the positioning of each X-ray source remains unchanged during image acquisition; b) at least one wide-field X-ray detector, where the positioning of each wide-field detector remains unchanged during image acquisition; c) at least one pre-object collimator, where each pre-object collimator is positioned between an X-ray source and the object of interest, and each pre-object collimator has an opening that undergoes a continuously oscillatory translational movement along an arc; d) at least one post-object collimator, where each post-object collimator has an opening that undergoes a continuously oscillatory translational movement along an arc; and e) an object holder assembly capable of translating in three-dimensional space and rotating about three axes during image acquisition.

Also described herein, in certain embodiments, are methods of performing CT image acquisition comprising: a) changing the positioning of the object of interest using translational and rotational degrees of freedom during image acquisition; b) generating an X-ray beam at each X-ray source and collimating the generated beam into a narrow beam; c) moving each pre-object collimator's opening along an oscillatory translational arc with an axis of oscillation that is between the X-ray source and the object; d) moving each post-object collimator's opening along an oscillatory translational arc between the object and the wide-field detector; and e) synchronizing the oscillatory translation speed and phase of the post-object collimator with those of the corresponding pre-object collimator, such that the X-ray photons that pass through the object without undergoing scatter interactions are able to pass through the opening of the post-object collimator and reach the sensitive area of the wide-field detector.

Moreover, described herein, in certain embodiments, are stationary-source computed tomography (CT) systems comprising: a stationary X-ray source configured to generate a beam of X-ray photons; a pre-object collimator positioned between the stationary X-ray source and an object of interest and comprising an opening configured to oscillate on a first translational arc having a first center of oscillation; a narrow-field X-ray detector configured to oscillate on a second translational arc having a second center of oscillation; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the narrow-field X-ray detector from the second center of oscillation, and $D_2$ is a distance of the stationary X-ray source from the second center of oscillation; a structure configured to articulate the position of the object of interest between the pre-object collimator and the narrow-field X-ray detector within a field of view and move the object of interest on a nonplanar trajectory; and a controller configured to perform at least the following operations: oscillating the opening of the pre-object collimator on the first translational arc with less than 360 degrees rotation; oscillating the narrow-field X-ray detector on the second translational arc with less than 360 degrees rotation; synchronizing a speed and a phase for the oscillatory translation of the narrow-field X-ray detector with the opening of the pre-object collimator; and moving the object of interest on the nonplanar trajectory within the field of view during an image acquisition.

Also described herein, in certain embodiments, are methods of performing computed tomography (CT) to image an object of interest comprising: generating, at a stationary X-ray source, a beam of X-ray photons; oscillating an opening of a pre-object collimator, the pre-object collimator positioned between the stationary X-ray source and an object of interest, the opening configured to oscillate on a first translational arc having a first center of oscillation, and the oscillation on the first translational arc having less than 360 degrees rotation; oscillating a narrow-field X-ray detector, the narrow-field X-ray detector configured to oscillate on a second translational arc having a second center of oscillation, and the oscillation on the second translational arc having less than 360 degrees rotation; synchronizing a speed and a phase for the oscillatory translation of the narrow-field X-ray detector with the opening of the pre-object collimator; positioning of the object of interest between the pre-object collimator and the narrow-field X-ray detector within a field of view; and moving the object of interest on a nonplanar trajectory during an image acquisition; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the narrow-field X-ray detector from the second center of oscillation, and $D_2$ is a distance of the stationary X-ray source from the second center of oscillation.

Also described herein, in certain embodiments, are stationary-source and stationary-detector computed tomography (CT) systems comprising: a stationary X-ray source configured to generate a beam of X-ray photons; a pre-object collimator positioned between the stationary X-ray source and an object of interest and comprising an opening configured to oscillate on a first translational arc having a first center of oscillation; a stationary wide-field X-ray detector configured to acquire X-ray photons; a post-object collimator positioned between the object of interest and the stationary wide-field X-ray detector, comprising an opening configured to oscillate on a second translational arc having a second center of oscillation; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the opening of the post-object collimator from the second center of oscillation, and $D_2$ is a distance of the stationary X-ray source from the second center of oscillation; a structure configured to articulate the position of the object of interest between the pre-object collimator and the post-object collimator within a field of view and move the object of interest on a nonplanar trajectory; and a controller configured to perform at least the following operations: oscillating the opening of the pre-object collimator on the first translational arc with less than 360 degrees rotation; oscillating the opening of the post-object collimator on the second translational arc with less than 360 degrees rotation; synchronizing a speed and a phase for the oscillatory translation of the opening of the post-object collimator with the opening of the pre-object collimator; and moving the object of interest on the nonplanar trajectory within the field of view during an image acquisition.

Also described herein, in certain embodiments, are methods of performing computed tomography (CT) to image an object of interest comprising: generating, at a stationary X-ray source, a beam of X-ray photons; oscillating an opening of a pre-object collimator, the pre-object collimator positioned between the stationary X-ray source and an object of interest, the opening configured to oscillate on a first translational arc having a first center of oscillation, and the oscillation on the first translational arc having less than 360 degrees rotation; oscillating an opening of a post-object collimator, the post-object collimator positioned between the object of interest and a stationary wide-field X-ray detector, the opening configured to oscillate on a second translational arc having a second center of oscillation, and the oscillation on the second translational arc having less than 360 degrees rotation; synchronizing a speed and a phase for the oscillatory translation of the opening of the post-object collimator with the opening of the pre-object collimator; positioning the object of interest between the pre-object collimator and the and the post-object collimator within a field of view; and moving the object of interest on a nonplanar trajectory during an image acquisition; wherein the first translational arc and the second translational arc have parallel axes of rotation; and wherein:

$$\frac{R_1}{D_1} = \frac{R_2}{D_2}$$

when: $D_1$ is a distance of the stationary X-ray source from the first center of oscillation, $R_1$ is a distance of the opening of the pre-object collimator from the first center of oscillation, $R_2$ is a distance of the opening of the post-object collimator from the second center of oscillation, and $D_2$ is a distance of the stationary X-ray source from the second center of oscillation.

Figure 4:
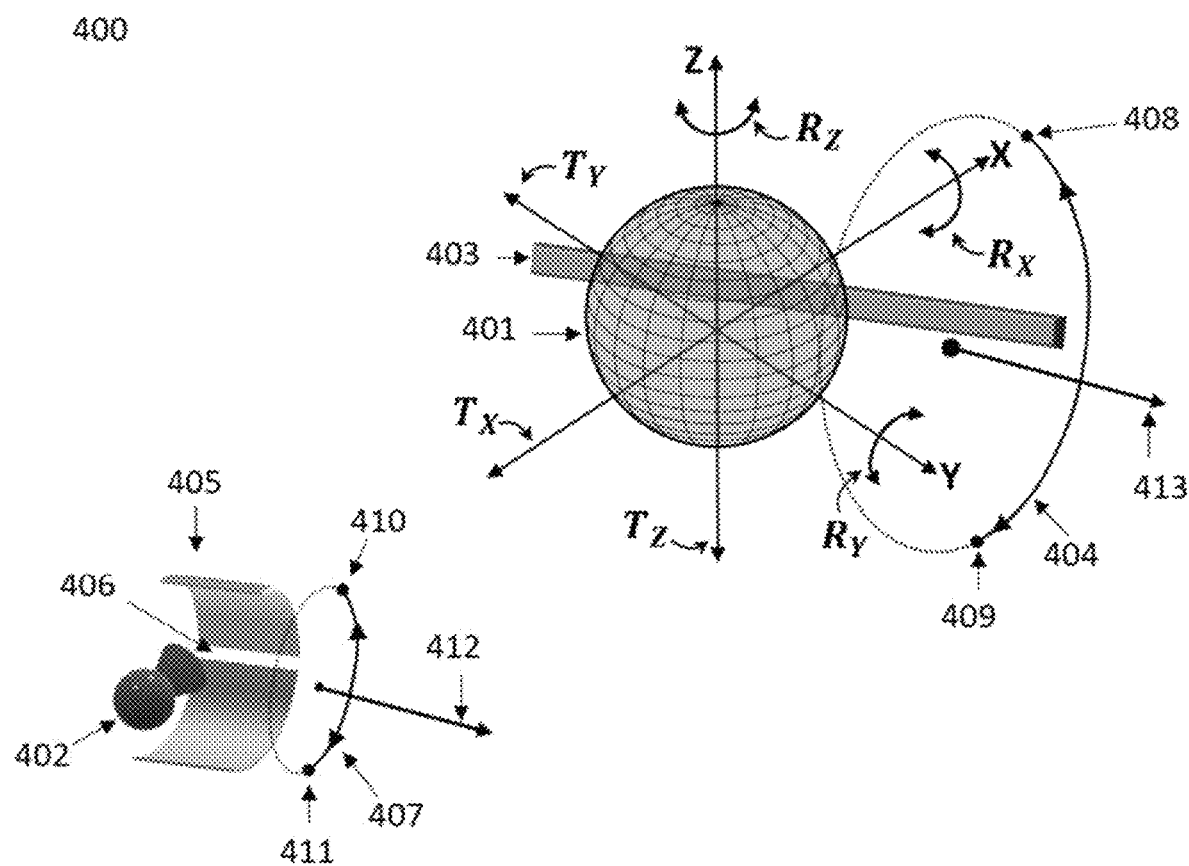
FIG. 4 is a perspective view that shows an embodiment of the disclosed imaging apparatus.

FIG. 4 illustrates a prospective view of an exemplar CT design 400 based on the present disclosure. The region between the X-ray source and X-ray detector where the Tuy's sufficiency condition is satisfied, is a sphere 401. Hereinafter, this region is referred to as the field-of-view. The X-rays are generated in at least one X-ray source 402. The primary X-rays that pass through the object are acquired at an elongated X-ray detector 403, which is referred to hereinafter as the narrow-field detector. The narrow-field detector has a limited coverage-meaning that at each instance of time where an X-ray exposure is made, only a small part of the imaging system's field-of-view 401 is measured. According to the present disclosure, the elongation of the sensitive area is at least an order of magnitude larger in one direction versus the other. For example, a horizontally positioned narrow-field detector, such as the one shown in FIG. 4, has a fan angle coverage that is an order of magnitude larger than its cone angle coverage (refer to FIG. 1 for the definitions of fan angle and cone angle). This constraint is necessary to avoid acquiring the photons that are scattered in the object. With this design, in some embodiments, the ratio of the acquired scattered photons to the acquired primary photons is less than 0.05, meaning that less than 5% of the overall acquired data in the narrow-field detector is of the scattered type.

In this setup, the limited coverage of the narrow-field detector 403 means that only a partial segment of the object 401 is measured at each instance of time. Therefore, the narrow-field detector continuously moves along a translational arc 404 to fully measure the object placed in the field-of-view. The X-rays generated in the X-ray source 402 are collimated in a pre-object collimator 405 which is used to collimate the sourced beam into a narrow beam that is aligned with the narrow-field detector. The narrow beam is a substantially elongated rectangular beam. The coverage of the narrow beam is an order of magnitude larger on one side than the other. For example, if the non-collimated coverage of the beam is 30 degrees fan angle and 30 degrees cone angle, the pre-object collimator that collimates along the fan angle will form a narrow beam that is 3 degrees in fan angle and 30 degrees in cone angle. This is achieved through a narrow opening 406 within the pre-object collimator structure 405. As stated above, during an imaging acquisition, the narrow-field detector 403 moves along its trajectory 404. Accordingly, the pre-object collimator's opening 406 moves along a translational arc 407, such that the beam that is formed in the pre-object collimator 405 is always incident on the narrow-field detector 403. The translational movement of the narrow-field detector is such that it oscillates between a starting point 408 and an ending point 409. Similarly, the pre-object collimator's opening oscillates between a starting point 410 and an ending point 411.

During image acquisition, the object of interest is placed within the field-of-view 401 of the imaging system. The apparatus of the CT system allows for articulation of the positioning of the object of interest in multiple, and up to six, degrees of freedom, which are in some embodiments comprised of three translational and three rotational movements. The translational movements are along the cartesian coordinate system. In FIG. 4, illustrating an exemplary embodiment, the translational movements are denoted as $T_X$, $T_Y$ and $T_Z$, which respectively represent translation along X, Y, and Z axes. Similarly, in an exemplary embodiment, the apparatus allows three rotational movements around X, Y, and Z axes, which in FIG. 4 are denoted as $R_X$, $R_Y$ and $R_Z$, respectively.

A critical requirement for the relative positioning of the elements of the disclosed apparatus is that the axes of rotation of the narrow-field detector and the pre-object collimator must be parallel. Accordingly, the oscillatory translation of the pre-object collimator's opening 406 is along a plane with a normal 412 that is parallel to the normal 413 of the narrow-field detector's plane of oscillation. Without satisfying this condition, the moving narrow beam that is shaped in the pre-object collimator cannot be fully acquired in the narrow-field detector during the narrow-field detector's oscillatory motion.

Figure 5A:
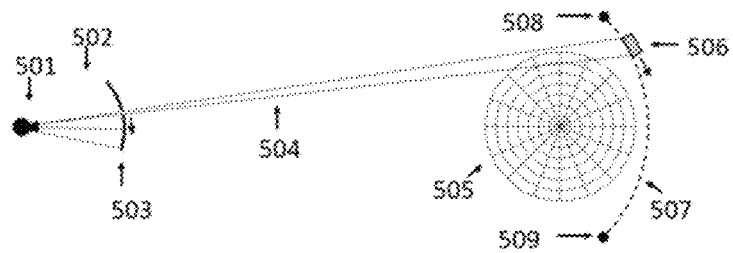
FIGS. 5A-5F describe the relative positioning of the main components of an embodiment of the disclosed imaging apparatus at six consecutive instances of time.
Figure 5B:
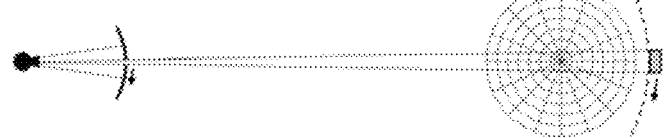
Figure 5C:
Figure 5D:
Figure 5E:
Figure 5F:
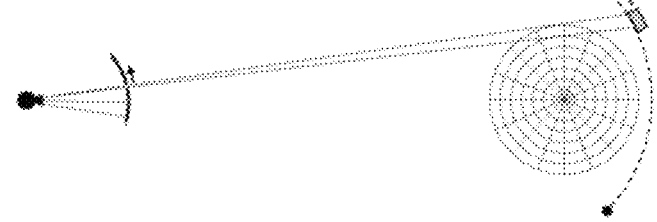

FIGS. 5A-5F illustrate the relative positioning of the main components of the CT system at six consecutive instances of time during image acquisition. These images show planar views of the imaging system's setup. The X-ray source 501 generates an X-ray beam 502. This beam is collimated in the oscillating pre-object collimator 503 to form a narrow beam 504. The resulting beam, after interacting with the object placed in the field-of-view 505, is acquired in the oscillating narrow-field detector 506. As stated previously, because of the small coverage of the narrow beam, the method of image acquisition requires the narrow beam to move. This is a necessary requirement of the image acquisition methodology, one that leads to the full measurement of the object placed in the field-of-view of the CT system. The narrow-field detector and the pre-object collimator oscillate synchronously, at the same speed and same phase, along their trajectories. The trajectory of the narrow-field detector is an arc 507, which starts from a starting point 508 and ends at an ending point 509. Due to the synchronous movement of the narrow-field detector and the pre-object collimator, as shown in FIGS. 5A-5C, the narrow beam follows the movement of the narrow-field detector, sweeping the entire field-of-view. As the narrow-field detector reaches the ending point of its trajectory, it comes to a stop. Then, as shown in FIGS. 5D-5F, the narrow-field detector moves in the opposite direction along the same arc, while the X-ray exposure continues. This oscillatory translational movement of the narrow-field detector continues until a predefined number of projections are acquired. Note that during image acquisition, the relative positioning of the object within the field-of-view changes using a positioning articulation structure that provides up to six degrees of freedom movement. Using the disclosed system and methodology, at the end of an image acquisition, the object is measured from different view angles while satisfying the Tuy's data sufficiency criterion.

Figure 6:
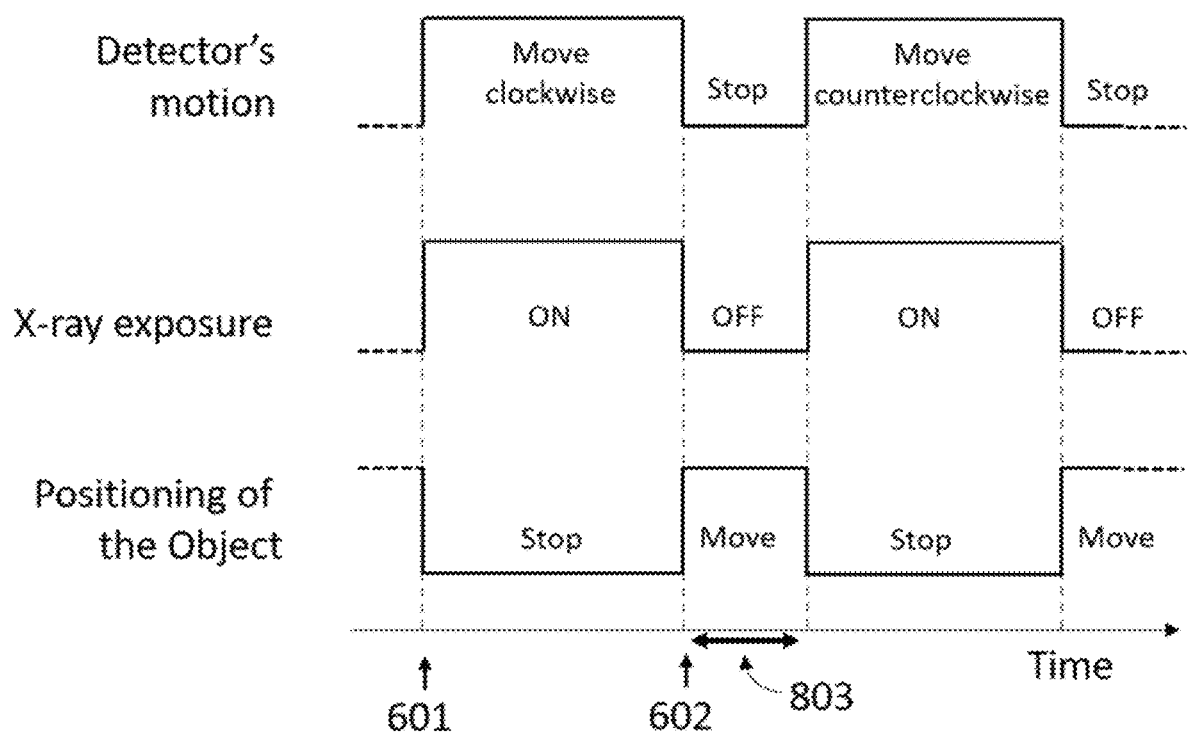
FIG. 6 is a diagram for the timing sequence for pulsed X-ray exposure in an embodiment of the invention.

During the described embodiment, the positioning of the objects within the field-of-view can change in two different ways. One strategy is described in this paragraph using the timing diagram shown in FIG. 6. Here, the X-ray exposure is pulsed, meaning that it is not continuously ON. During image acquisition, the narrow-field detector and the pre-object collimator move in tandem, with the same speed and phase. FIG. 6 highlights the timestamp 601 where the narrow-field detector starts its movement along its trajectory from its starting point. While the narrow-field detector moves, the X-ray exposure commences and stays ON until the narrow-field detector completes its transition from the starting point to the ending point. At timestamp 602, where the narrow-field detector reaches the ending point, the X-ray exposure turns OFF, and both the narrow-field detector's motion and the pre-object collimator's motion come to a stop. At this point, the object's position is adjusted. As soon as the positioning of the object is updated, the movements of the narrow-field detector and the pre-object collimator resume, and the X-rays turn ON. Therefore, the movement of the narrow-field detector is stepwise. The movement of the pre-object collimator's opening is also stepwise because the method of imaging requires that the pre-object collimator's opening always follows the narrow-field detector, ensuring that the primary X-rays within the narrow beam always hit the sensitive area of the narrow-field detector. This step-and-shoot sequencing continues until the object is measured from a predefined set of views. The main benefit of this strategy is that the positioning of the object remains constant in each clockwise or counterclockwise motion of the narrow-field detector. Therefore, during the time that each projection is acquired, the object remains stationary.

The strategy described in the previous paragraph simplifies image reconstruction because each projection occurs while the object's positioning is fixed. However, this strategy can lead to a long scan time, as the object's repositioning happens while no exposure is made. Additionally, the exposure is pulsed, which means this strategy requires the use of pulsed X-ray sources. Compared to continuous X-ray sources, pulsed X-ray sources are more complex to develop and, consequently, more costly to acquire and maintain.

Figure 7:
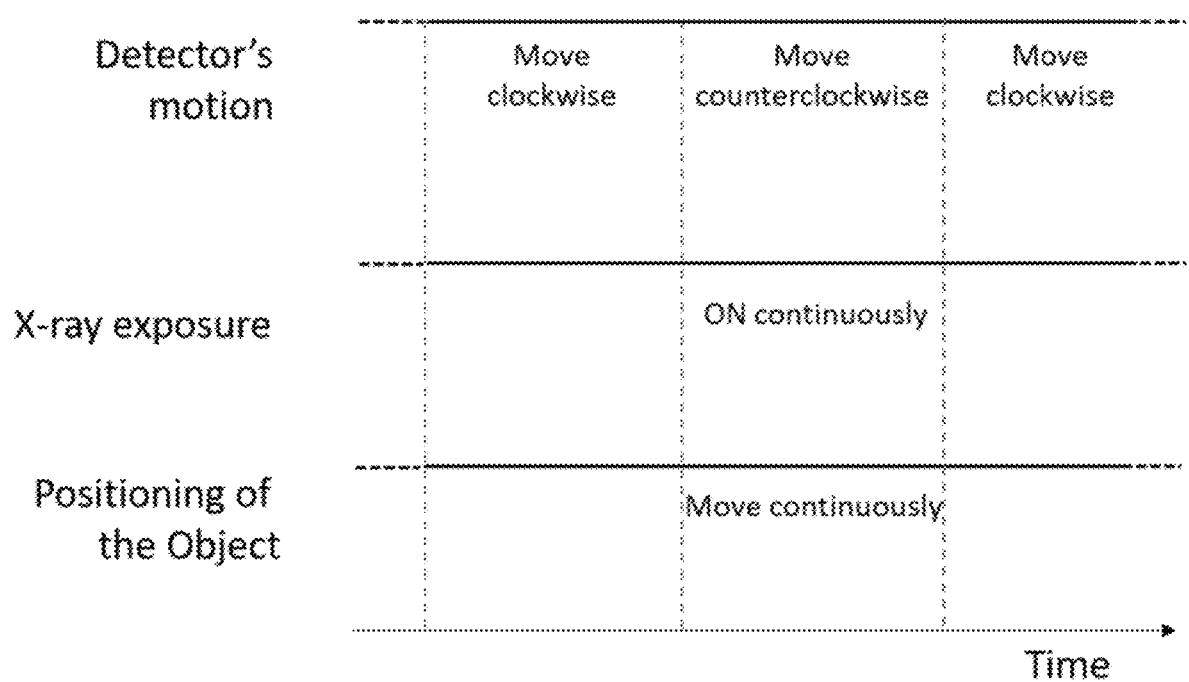
FIG. 7 is a diagram for the timing sequence for continuous X-ray exposure in an embodiment of the invention.

Alternatively, X-ray exposure can be left continuously ON during the narrow-field detector's movement, as shown in FIG. 7. The advantage of this approach is the acceleration of scan time compared to the strategy laid out in FIG. 6. However, the drawback is the potential blurring that may occur in the acquired projections because the object moves during the X-ray exposure. Therefore, the narrow-field detector's image acquisition should be triggered at a high enough frequency so that the motion of the object during the acquisition of each frame can be ignored. The exact frame rate at which the projections are acquired depends on the movement of the object, the radius of the narrow-field detector's trajectory, and the intended spatial frequency resolution of the imaging system.

Figure 8:
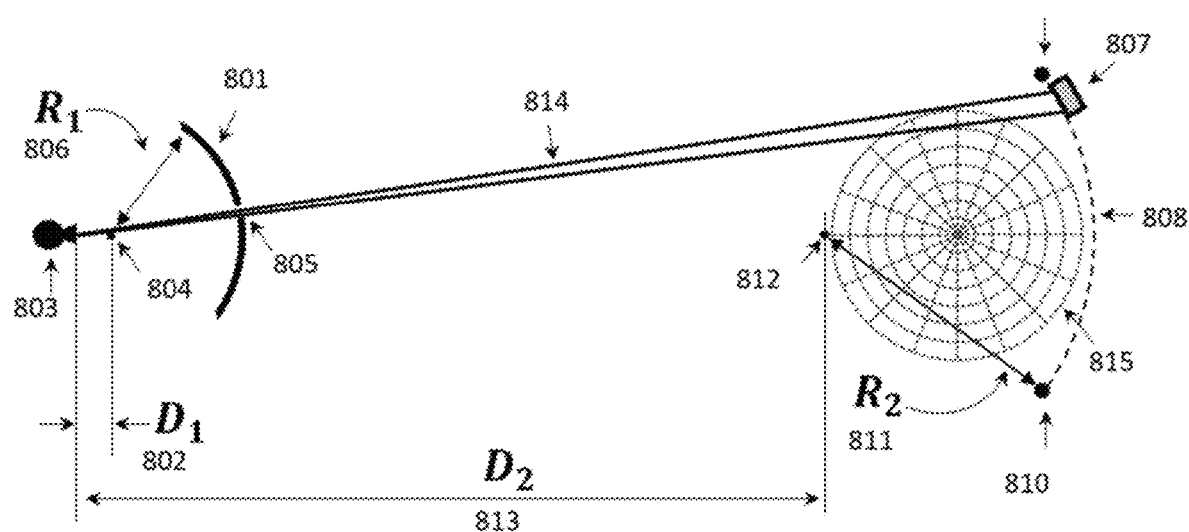
FIG. 8 illustrates the geometry of the imaging system in an embodiment of the invention.

The geometry of the disclosed apparatus must be designed such that the beam formed in the pre-object collimator is always incident on the surface of the narrow-field detector. The schematic shown in FIG. 8 assists with the parameterization of this geometry. As stated previously, the pre-object collimator 801 has an oscillatory translation on an arc. The distance 802 of the X-ray source 803 from the center 804 of oscillation of the pre-object collimator is parameterized as $D_1$. Therefore, the pre-object collimator's opening 805 oscillates at a constant distance 806 of $R_1$ from its center of oscillation 804. Similarly, the narrow-field detector 807 transitions through an arc 808 between a starting point 809 and an ending point 810. The narrow-field detector distance 811 from its axis of oscillation 812 is parameterized as $R_2$. The distance 813 between the narrow-field detector's axis of oscillation 812 and the X-ray source 801 is parameterized as $D_2$. The following equation constitutes the necessary and sufficient requirement to guarantee that the narrow beam 814 intersects with the narrow-field detector 807 throughout the narrow-field detector's oscillatory transition through its trajectory 808 during an image acquisition aimed at measuring the object placed in the field-of-view 815:

$$\frac{R_1}{D_1} = \frac{R_2}{D_2}. \qquad \text{Equation 1}$$

In other words, the ratio of the radius of the oscillatory translation of the opening of the pre-object collimator to the distance between the center of oscillation of the opening of the pre-object collimator and the X-ray source equals the ratio of the radius of the oscillatory translation of the narrow-field detector to the distance between the center of oscillation of narrow-field detector and the X-ray source.

Figure 9:
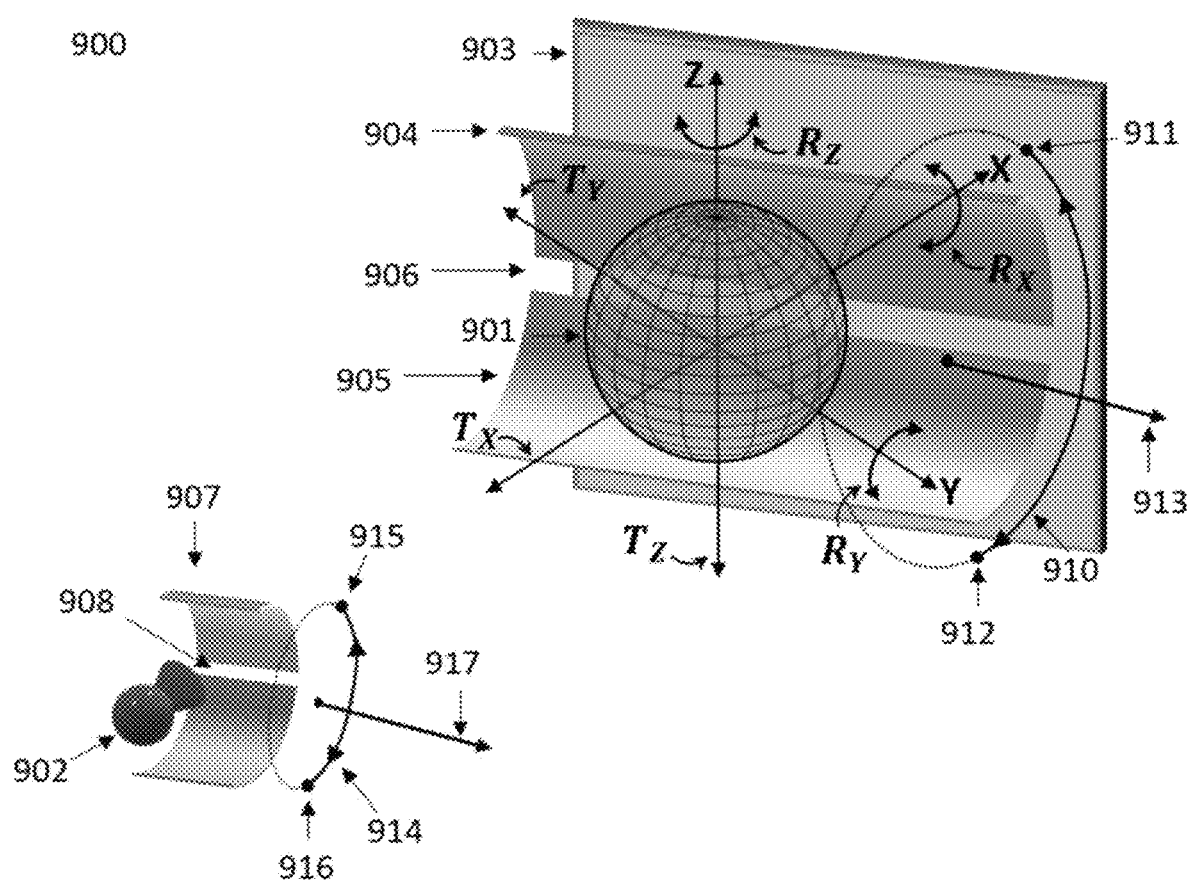
FIG. 9 is a perspective view that shows an embodiment of the disclosed imaging apparatus.

Another embodiment of the disclosed invention focuses on the usage of a wide-field detector in the imaging system. FIG. 9 illustrates a perspective view of the exemplar CT system 900 based on the present disclosure. Similar to the case shown in FIG. 4, the field-of-view of the imaging system is a sphere 901. The X-rays are generated in at least one X-ray source 902. The primary X-rays that pass through the object are acquired in a wide-field detector 903. Note that although the wide-field detector shown in FIG. 9 is a flat panel detector, a wide-field detector does not necessarily need to be flat. In general, an X-ray detector that is not a narrow-field detector (as defined herein) is a wide-field detector.

In such embodiments, the large coverage of the detector increases the likelihood of scattered X-rays being acquired by the detector. Therefore, a physical structure, hereinafter referred to as the post-object collimator, made up of two sheets 904-905, is placed between the field-of-view 901 and the wide-field detector 903 to block the scattered X-rays from reaching the wide-field detector. These sheets can be made of materials with high X-ray attenuation properties, such as tungsten or lead. The relative positioning of the sheets creates an opening 906. This opening allows the narrow beam to pass through the post-object collimator.

The narrow beam is formed in a pre-object collimator 907. Similar to the case shown in FIG. 4, the beam that is sourced at the X-ray source 902 is entirely stopped in the pre-object collimator 907, except for the part of the beam that exits the pre-object collimator through an opening 908. The narrow beam is a rectangular beam that is substantially elongated on one side compared to the other. The coverage of the narrow beam is an order of magnitude larger on one side than the other.

In this setup, the limited size of the opening 906 between the sheets of the post-object collimator means that only a partial segment of the field-of-view is measured at each instance of time. Therefore, the structure of the post-object collimator continuously moves so that the opening 906 has a translational movement along an arc 910 between two points 911-912. This arc is a partially circular path; therefore, the translation of the post-object collimator's opening occurs within a plane with a normal 913. Similarly, the pre-object collimator 907 moves so that its opening translates along an arc 914 between two points 915-916. This translation occurs within a plane with a normal 917. The normal 917 of the plane of oscillation of the pre-object collimator's opening must be parallel to the normal 913 of the plane of oscillation of the post-object collimator's opening.

During image acquisition, the object of interest is placed within the field-of-view 901. Similar to the apparatus shown in FIG. 4, the positioning during a CT scan can be articulated through multiple, and up to six, degrees of freedom, composed in some embodiments of three translational movements, signified in FIG. 9 as $T_X$, $T_Y$, and $T_Z$ along the Cartesian coordinate system, and three rotational movements, signified in FIG. 9 as $R_X$, $R_Y$, and $R_Z$ around the axes of the Cartesian coordinate system.

FIGS. 10A-10F illustrate the relative positioning of the main components of the CT system shown in FIG. 9 at six consecutive instances of time during image acquisition. The X-ray source 1001 generates an X-ray beam 1002, which is collimated in the oscillating pre-object collimator 1003 to form a narrow beam 1004. The resulting beam, after interacting with the object placed in the field-of-view 1005 and passing through the post-object collimator 1006, is acquired in the stationary wide-field detector 1007.

Figure 10A:
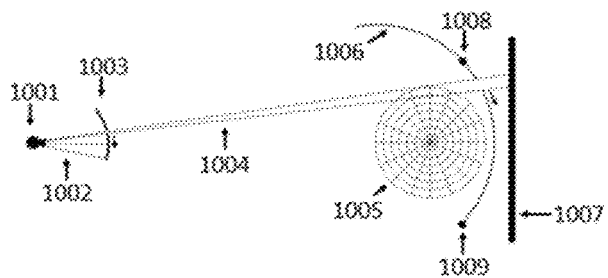
FIGS. 10A-10F describe the relative positioning of the main components of an embodiment of the disclosed imaging apparatus at six consecutive instances of time.
Figure 10B:
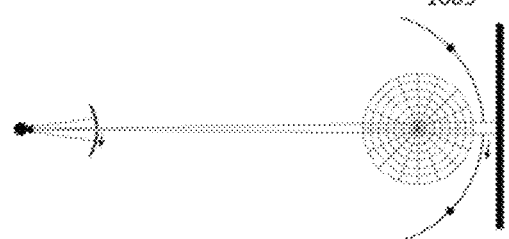
Figure 10C:
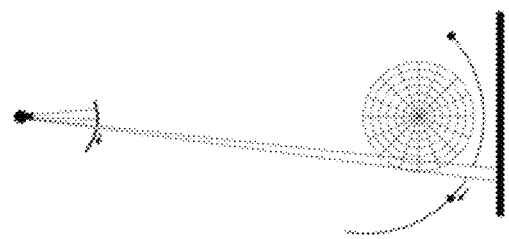
Figure 10D:
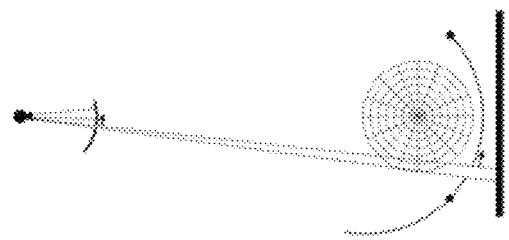
Figure 10E:
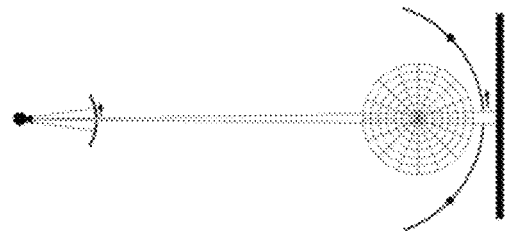
Figure 10F:
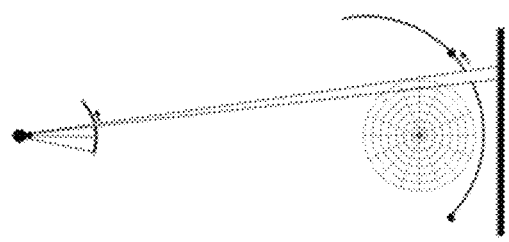

As stated previously, due to the small coverage of the narrow beam, the method of image acquisition requires the narrow beam to move. Accordingly, the opening of the post-object collimator moves along an arc between two points 1008-1009. The pre-object collimator and post-object collimator oscillate synchronously, at the same speed and phase, along their trajectories. Due to the synchronous movement of the pre-object and post-object collimators, as shown in FIGS. 10A-10C, the narrow beam sweeps the entire field-of-view. As the post-object collimator's opening reaches the endpoint 1009 of its trajectory, it comes to a stop. Then, as shown in FIGS. 10D-10F, the post-object collimator's opening moves in the opposite direction along the same arcs while the X-ray exposure continues. These oscillatory translational movements of the pre-object and post-object collimators continue until a predefined number of projections are acquired.

Figure 11:
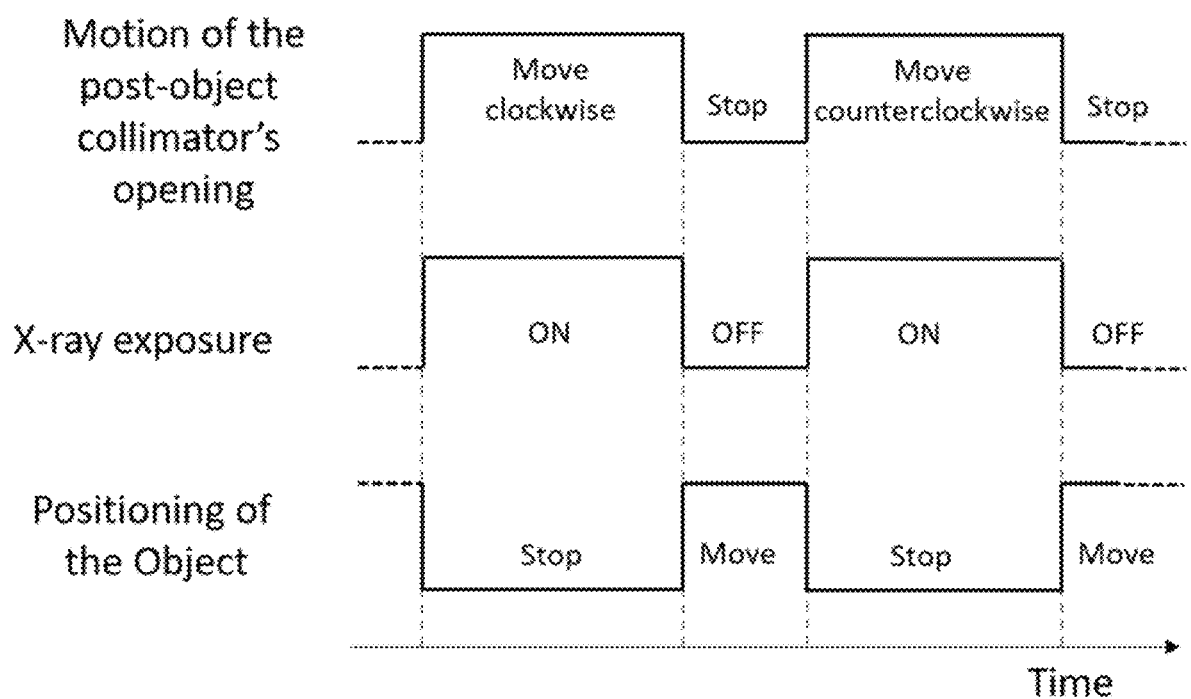
FIG. 11 is a diagram for the timing sequence for pulsed X-ray exposure in an embodiment of the invention.

Similar to the case shown in FIGS. 6 and 7, the positioning of the object within the field-of-view can be articulated in two ways. In the first strategy, as shown in FIG. 11, the positioning of the object will change only when there is no X-ray exposure. This occurs only when the post-object's opening has reached the terminal points of its trajectory along the arc. In other words, this is a step-and-shoot methodology for measuring the object, where during the X-ray exposure, the object is kept stationary.

Figure 12:
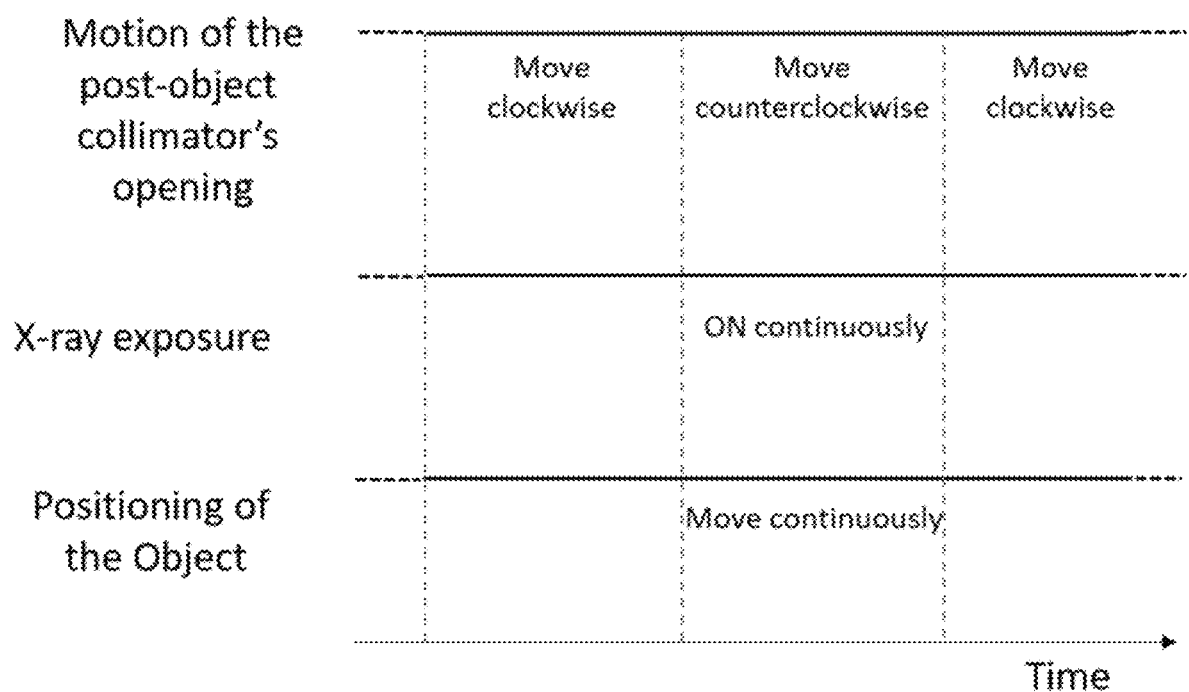
FIG. 12 is a diagram for the timing sequence for continuous X-ray exposure in an embodiment of the invention.

Alternatively, as shown in FIG. 12, the X-ray exposure can continue without interruption while the positioning of the object changes. This means that different parts of the projections acquired in the wide-field detector contain information about the object at different positions. Therefore, the image reconstruction methodology should account for the variability in the positioning of the object; otherwise, the spatial resolution of the imaging system will be negatively impacted due to the object motion blurring artifact.

Figure 13:
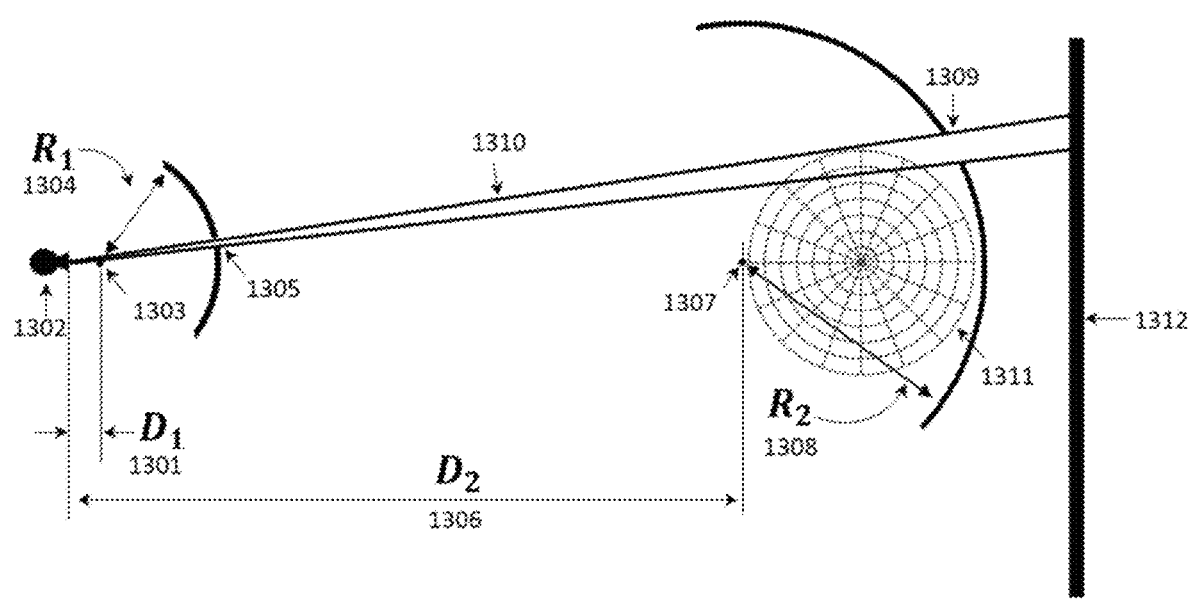
FIG. 13 illustrates the geometry of the imaging system in an embodiment of the invention.

To ensure the passage of the narrow beam through the opening of the post-object collimator, a mathematical relationship must be defined. The schematic shown in FIG. 13 assists with the parametrization of this geometry. Here, the distance 1301 between the X-ray source 1302 and the center 1303 of the oscillatory motion of the pre-object collimator's opening is defined as $D_1$. The distance 1304 between the pre-object's opening 1305 and its center of rotation 1303 is parameterized as $R_1$. The distance 1306 between the axis of rotation of the pre-object collimator's opening and the axis of rotation 1307 of the post-object collimator's opening is parameterized as $D_2$. The distance 1308 between the post-object collimator's opening 1309 and its axis of rotation 1307 is parameterized as $R_2$. With these parametrizations, the relationship defined in Equation 1 establishes the necessary and sufficient requirement that the narrow beam 1310, generated by the stationary source 1302 and formed via the pre-object collimator's opening 1305, can pass through the field-of-view 1311 and the post-object collimator's opening 1309, and be acquired by the stationary wide-field detector 1312. This formulation states that the ratio of the radius of the oscillatory translation of the opening of the pre-object collimator to the distance between the center of oscillation of the opening of the pre-object collimator and the X-ray source equals the ratio of the radius of the oscillatory translation of the opening of the post-object collimator to the distance between the center of oscillation of the opening of the post-object collimator and the X-ray source.

Using the disclosed invention, the more than two-dimensional rotation of the object allows for resolving the data insufficiency limitations of the circular trajectory CT methodologies and the artifacts that result from these limitations. A computer simulation experiment, highlighting the benefits, is described in this and the next paragraph. Here, a disc phantom, commonly used for quality assessment of CT systems, is simulated to identify cone-beam artifacts. This phantom is composed of several circular disks stacked on top of each other, with gaps between neighboring disks. The experimental setup is illustrated in FIGS. 14A-14B.

The described disk phantom is placed within the imaging system's field-of-view 1401 and measured using the X-rays that are generated by an X-ray source 1402, formed into a narrow beam inside a pre-object collimator 1403, and detected by a narrow-field X-ray detector 1404. As described previously, the methodology of image acquisition requires that the narrow-field detector 1404 has an oscillatory translation movement along its arc 1405 between two points 1406-1407 around an axis of oscillation 1408. Similarly, the pre-object collimator 1403 has an oscillatory translation movement, such that the pre-object collimator's opening translates along an arc 1409 between two points 1410-1411 around an axis of oscillation 1412. The positioning of the object within the field-of-view 1401 can change through the Cartesian axes X, Y, and Z.

Figure 14A:
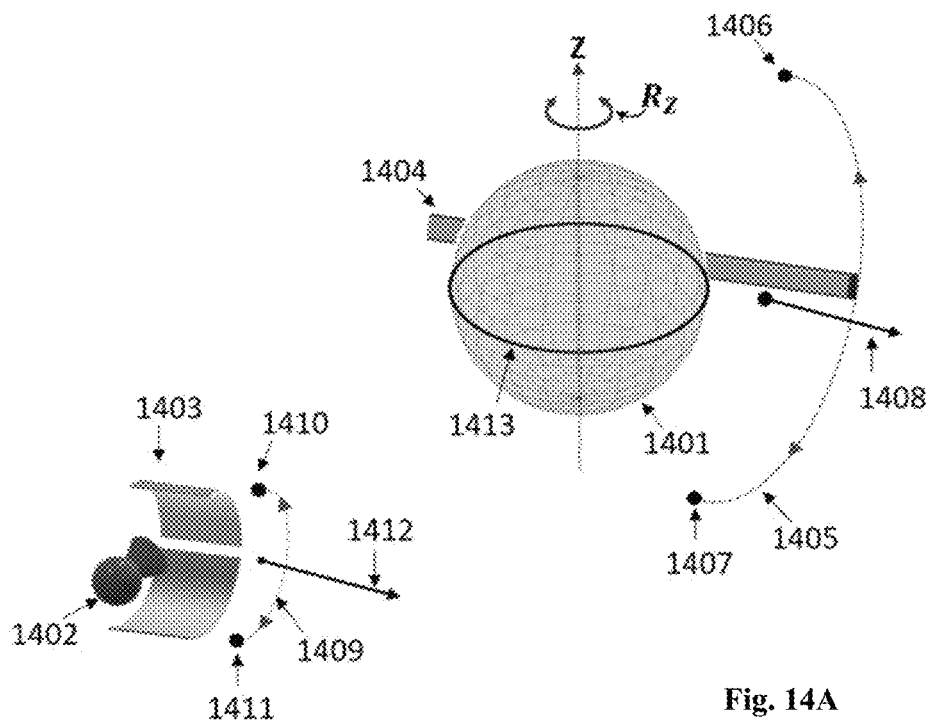
FIGS. 14A and 14B describe planar and non-planar trajectories.
Figure 14B:
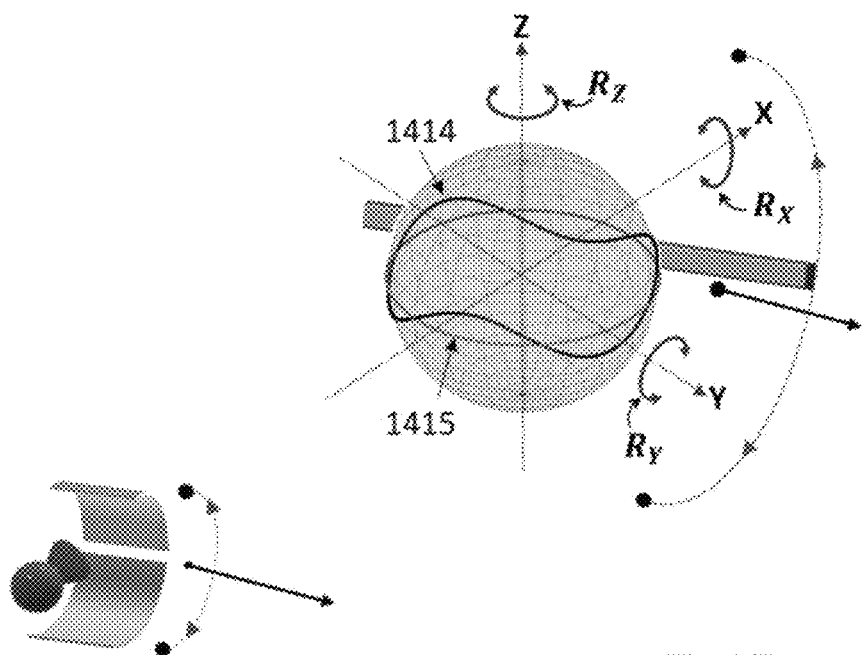

If the movement of the object is confined to rotation $R_Z$ around a single axis such as Z, as shown in FIG. 14A, then each point of the field-of-view is measured on a planar path 1413. In other words, the trajectory of each point of the imaging system's field-of-view fits into a two-dimensional plane. Alternatively, as shown in FIG. 14B, the positioning of the phantom can be articulated-through the apparatus and methodology of the disclosed subject matter-along more than one axis of the Cartesian coordinate system, such as rotation $R_X$ around axis X, rotation $R_Y$ around axis Y, and rotation $R_Z$ around axis Z, so that each point of the field-of-view follows a non-planar path 1414, one that provides more than two-dimensional coverage of the object, unlike the coverage of a planar path 1415.

Figure 15A:
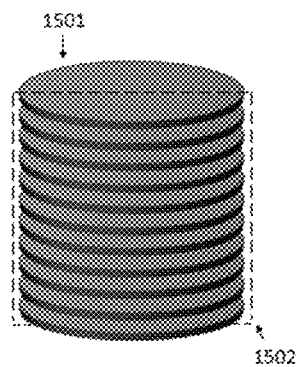
FIGS. 15A-15E illustrate the experimental setup, and the results of scanning a disk phantom according to planar and non-planar trajectories.
Figure 15B:
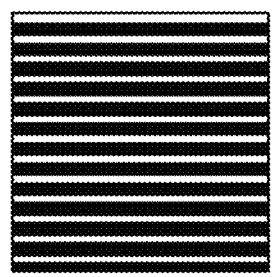
Figure 15C:
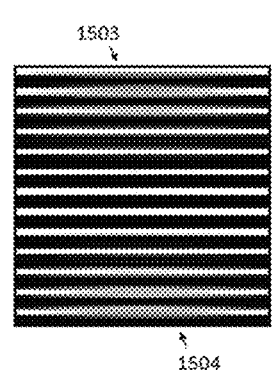
Figure 15D:
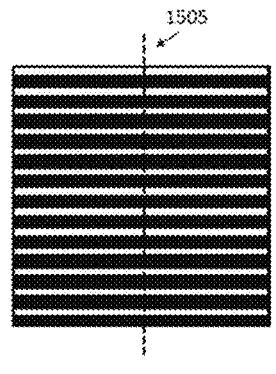

An insight into the benefits of this methodology can be gained by placing the disk phantom within the spherical field-of-view of the imaging system. A visual representation of the disk phantom is provided in FIG. 15A. A cross-section of the phantom 1501 across the plane signified by the dashed lines 1502 is shown in FIG. 15B. This image serves as the ground truth in the experiment. Two image acquisitions were simulated based on the trajectories shown in FIGS. 14A-14B: the planar trajectory 1415 and the nonplanar trajectory 1414. FIGS. 15C-15D illustrate the CT image sections across the plane 1502 shown in FIG. 15A. In the CT image acquisition performed using the planar trajectory, different levels of blurring 1503-1504 can be observed at the location of the top and bottom disks. This blurring is a form of cone-beam artifact that results from data insufficiencies of the planar trajectory. On the contrary, in the image obtained from the nonplanar trajectory CT, no discernable blurring is observed.

Figure 15E:
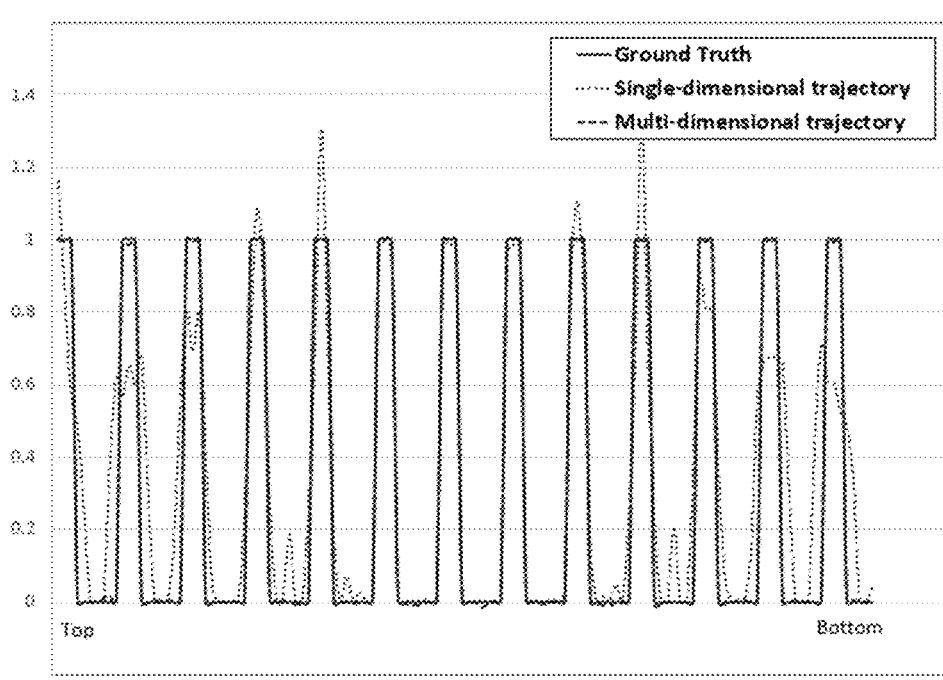

To put it concretely, profiles along the dashed line 1505 shown in FIG. 15D are depicted in FIG. 15E. Of note is the near-complete overlap of the profiles of the ground truth phantom (FIG. 15B) and the nonplanar trajectory CT (FIG. 15D). In contrast, large deviations from the ground truth are observed in the case of the planar trajectory CT (FIG. 15C). These results highlight the effectiveness of the apparatus and the methodology of operation in resolving the artifact.

Figure 16:
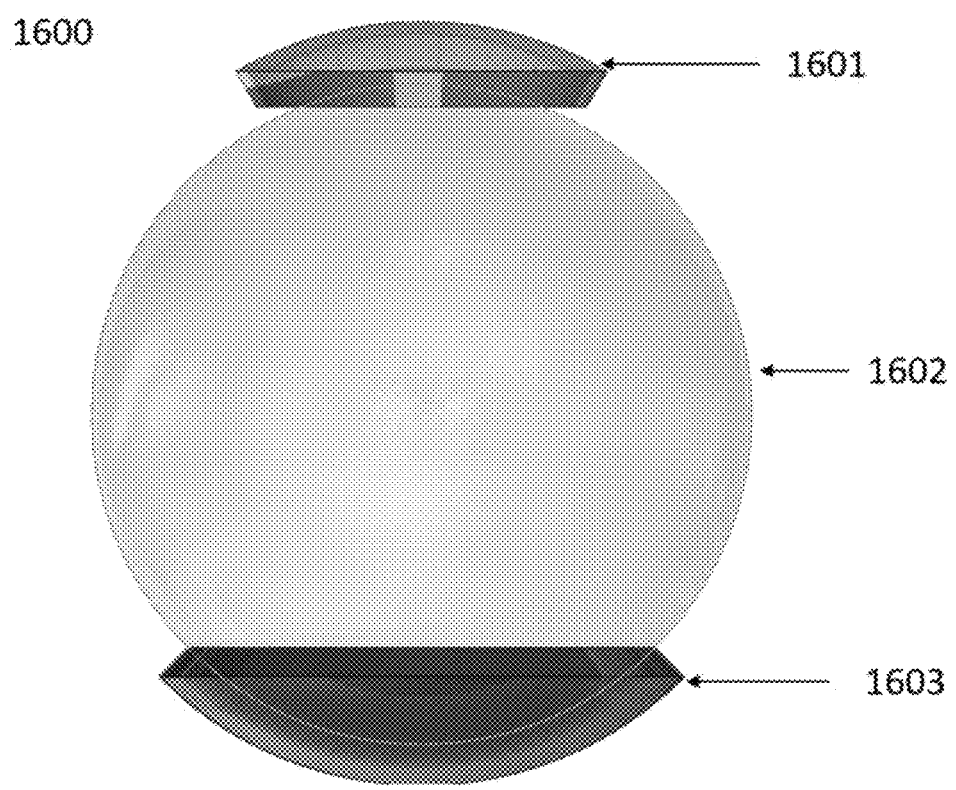
FIG. 16 illustrates the design of the apparatus that contains the object of interest, and allows for the articulation of its positioning during a scan.

Another embodiment of the subject matter described herein focuses on a physical apparatus for housing the object of interest and the methodology of changing its position. As shown in FIG. 16, in some embodiments, the apparatus that houses the object of interest is a structure 1600 composed of three major components: a top section 1601, a spherical carriage that houses the object of interest 1602, and a bottom section 1603. The combination of the top and bottom sections of the structure 1600 creates a clamping mechanism with the appropriate amount of force to hold the carriage 1602 in place. The spherical carriage 1602 is formed of radiolucent materials, such as thermoplastics with carbon fiber reinforcement or a custom laminate. Such materials possess sufficient thickness and strength to resist the clamping force from the top and bottom sections and also allow for passage of the X-ray beam through them unattenuated. The ability of the X-ray beam to enter and exit the carriage, attenuated only by its interaction with object of interest, is necessary for imaging. The hollow interior of the carriage can be exposed via a door in the carriage exterior that enables placement of the object of interest for an imaging procedure.

In some embodiments, the external surface of the carriage can either be smooth or textured to a specific roughness all around the exterior to accommodate the friction required for the motor section to move the carriage. In other embodiments, the exterior can utilize rail grooves to allow for the motor section of the clamp to move the carriage. Examples of these embodiments are shown in FIGS. 17A and 17B. The textured external surface in FIG. 17A allows full and unrestricted movement of the sphere, enabling a full 360 degrees of movement along the entire surface of the carriage. An example of a rail groove pattern on the external surface, as illustrated in FIG. 17B, allows a more stable and precise form of movement in up to three rotational degrees of freedom. Such a railing mechanism can be developed by extracting from the carriage's spherical wall or by adding rail grooves externally as a separate piece onto the wall. The rail can be smooth or can have a pattern (e.g., teeth) to allow for a more mechanically coupled movement with the motors from the top and/or bottom sections.

Figure 18A:
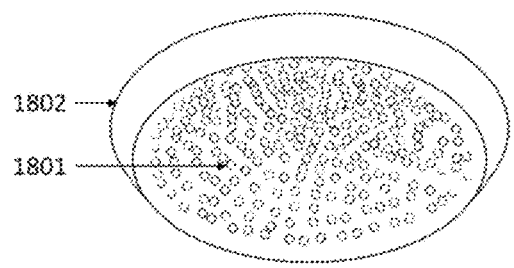
FIGS. 18A and 18B show the structures of the top and bottom sections of the object holder apparatus.
Figure 18B:
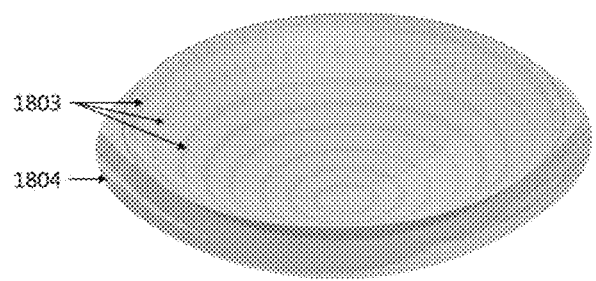

In some embodiments, the top and bottom sections of the object housing structure provide a mechanism for articulating the positioning of the object of interest relative to the X-ray source and X-ray detector. Change in the object's positioning can be achieved by incorporating rotational motor drives, free rollers, or a combination of both, for example, into the top and bottom sections of the spherical housing, as illustrated in FIGS. 18A and 18B. In some embodiments, the carriage is rotated in various ways using a combination of a free roller and a motor section. In other embodiments top and bottom motor sections could be utilized to achieve the desired motion.

An example of a free roller is shown in FIG. 18A, in which free-floating metal balls 1801 are held in place by the structure 1802. The movement of this ball-bearing mechanism is defined by patterns that constrain the movement of the spherical carriage. The housed bearing balls 1801 are positioned between the carriage and the free roller section 1802, creating minimal friction while maintaining a force along the surface of the carriage to hold it in place.

An example of a motor section is shown in FIG. 18B, in which three rotational degrees of movement are enabled via a combination of motors, gears, and actuators that shift and move the contact rollers 1803. The movements of the carriage are facilitated by a circular row of rollers 1803, attached to a base 1804, which imposes a motion profile onto the surface of the carriage. Using the surface friction or the rail grooves of the carriage, each circular row of rollers can grip the carriage and use that friction to rotate the carriage in the desired direction. Due to the spherical shape of the carriage, the movement will always be a rotational degree of freedom. When a particular rotational direction is not aligned with the roller's degree of freedom, the roller can disengage from the motor and move freely according to the other degrees of motion. This allows the carriage to move freely in any rotational direction.

In an embodiment where both top and bottom sections are comprised of motor sections as shown in FIG. 18B, the rotational movements of both the top and bottom parts of the carriage can be synchronized, resulting in more precise and controlled motion. The dimensions of these sections will be determined by considering several factors, such as the size of the carriage, the required clamping force, the strength of both the carriage and the chassis/structure, and the desired speed and type of movement of the carriage.

Figure 19:
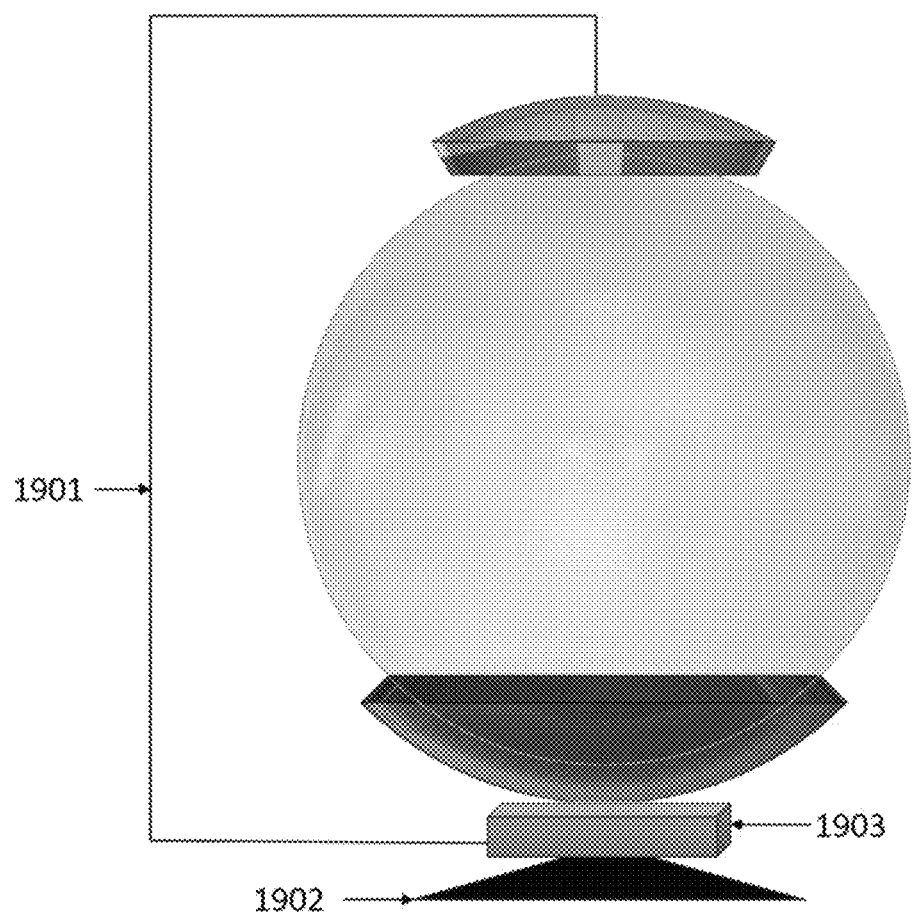
FIG. 19 shows the apparatus of the object holder's system that provides up to six degrees of freedom for the articulation of the object's positioning within the CT system during a scan.

FIG. 19 illustrates an exemplary chassis composed of a gantry structure 1901 that holds the top and bottom sections of the object holder structure. Since the apparatus relies on an appropriate clamping force to keep the carriage in place, this structure must hold both the top and bottom sections together with the necessary structural strength and normal force. This structure is essentially a C-shaped clamp that allows X-rays to pass through the carriage without interfering with the image. An appropriate base 1902 must be used to anchor the system down, creating a stable platform for the movement of the carriage. The lower portion of the C-shaped structure can also accommodate an additional platform to allow three additional linear degrees of freedom. This additional platform 1903 can be mounted on the lower arm of the C-shaped structure 1901 and above the base 1902. Two linear actuators or linear stages within this structure 1903 can create X-Y movement for the spherical object holder apparatus. Additionally, a vertically mounted rail and motor within the structure 1903 can create an additional Z movement. In total, using the disclosed apparatus, six degrees of freedom—three translational and three rotational—can be applied to the spherical object holder.

Figure 20A:
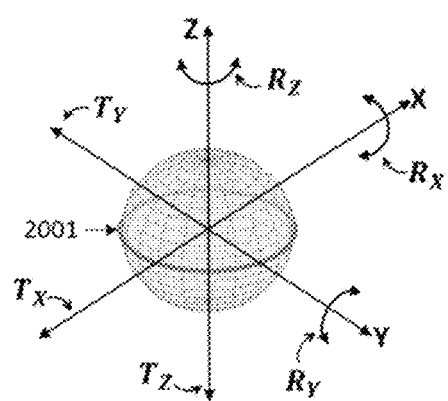
FIGS. 20A-20C show exemplary non-limiting nonplanar trajectories.
Figure 20B:
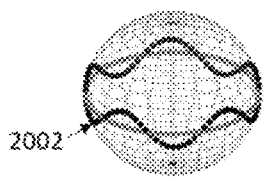
Figure 20C:
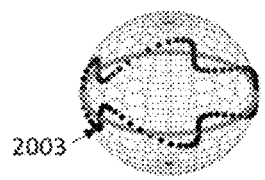

The apparatus and methodology of the disclosed subject matter provides a maximum of three rotations—along more than one axis of the Cartesian coordinate system, such as rotation $R_X$ around axis X, rotation $R_Y$ around axis Y, and rotation $R_Z$ around axis Z—and a maximum of three translations—along more than one axis of the Cartesian coordinate system, such as translation $T_X$ along axis X, rotation $T_Y$ along axis Y, and translation $T_Z$ along axis Z. However, the nonplanar trajectory required to resolve a specific artifact in the CT image volume of a specific object may require less than all three rotational and all three translational degrees of freedom. Some examples are shown in FIGS. 20A-20C. In these examples, a planar trajectory 2001 is illustrated, which is achieved if the object holder's carriage rotates along one axis of rotation such as Z. In contrast, any additional rotation around a different Cartesian axis may result in a nonplanar movement. For example, FIG. 20B, shows a nonplanar trajectory 2002 that results from a rotational movement around axis Z and a sinusoidal rotational movement around axis X. Adding a sinusoidal rotational movement around axis Y to the case shown in FIG. 20B results in a nonplanar trajectory shown in FIG. 20C. As illustrated, rotations around two axes, such as the case shown in FIG. 20B, are the minimum requirement in achieving a nonplanar trajectory. Depending on the objective and the object of interest, the minimum number of independent rotations (two rotational degrees of freedom) may be sufficient to achieve a nonplanar trajectory that meets the requirements of the scan. On the other hand, in some applications, it may be necessary to use the maximum number of independent rotations (three rotational degrees of freedom) that the apparatus and methodology of the disclosed subject matter provide.

During an imaging procedure in which the housing of the object of interest undergoes nonplanar movement, the object of interest is also undergoing nonplanar movement. As the purpose of such movement is for target imaging, the object of interest must be fixed in position within the interior of the housing. Such fixation is necessary to ensure that while the absolute positioning in space of the object is changing in a nonplanar manner, the relative positioning of the object of interest to its housing remains constant. The method of such fixation may be achieved in different ways, specific to the type of object being imaged.

In some embodiments, for example, the housing for the object of interest is designed to allow for imaging of rigid objects, while in other embodiments the housing is designed to allow for imaging of non-rigid or soft objects. Examples of rigid objects might be mineral or rock specimens, batteries or electronic components, bones from an organism, or containers which themselves house smaller objects of interest. Examples of non-rigid or soft objects might be plants, anatomical organs, or small mammalian specimens such as a mouse or rat. As illustrated by these examples, objects of interest for imaging may be anatomical or non-anatomical.

As the housing for the object of interest, in some embodiments, takes the general form of a hollowed-out sphere that must be moveable on a nonplanar trajectory, the object of interest may be held in position via internal bindings that are suitable for fixating the object given its properties of rigidity. To fixate a non-rigid anatomical object, for example, one or more expandable bladders might be positioned within the interior of the carriage following positioning of the object, and filled to expand entirely such that the object is fixated in a desired location. Such a method would allow for conformation of the bladder to the object such that it was fixated and prevented from shifting position relative to the housing during nonplanar movement. The thickness and pressure of such bladders would be determined in accordance with the resistance presented by the object such that fixation was achieved without incurring damage to the object. In instances of rigid object imaging a clamping strategy for fixation might be utilized. For example, a flat surface with a bolt hole pattern made from radiolucent material, as with the carriage, could be used to clamp a rigid object in place from one or more angles. With such strategies and implementations, nonplanar imaging of a wide range of object types is made possible.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A stationary-source computed tomography (CT) system comprising:
   a) a stationary X-ray source configured to generate a beam of X-ray photons;
   b) a pre-object collimator positioned between the stationary X-ray source and an object of interest and comprising an opening configured to oscillate on a first translational arc having a first center of oscillation;
   c) a narrow-field X-ray detector configured to oscillate on a second translational arc having a second center of oscillation;
      wherein the first translational arc and the second translational arc have parallel axes of rotation;
      wherein:

$$\frac{R_1}{D_1} = \frac{R_2}{D_2}$$

when:
   $D_1$ is a distance of the stationary X-ray source from the first center of oscillation,
   $R_1$ is a distance of the opening of the pre-object collimator from the first center of oscillation,
   $R_2$ is a distance of the narrow-field X-ray detector from the second center of oscillation, and
   $D_2$ is a distance of the stationary X-ray source from the second center of oscillation;
   d) a structure configured to articulate the position of the object of interest between the pre-object collimator and the narrow-field X-ray detector within a field of view and move the object of interest on a nonplanar trajectory; and
   e) a controller configured to perform at least the following operations:
      i) oscillating the opening of the pre-object collimator on the first translational arc with less than 360 degrees rotation;
      ii) oscillating the narrow-field X-ray detector on the second translational arc with less than 360 degrees rotation;
      iii) synchronizing a speed and a phase for the oscillatory translation of the narrow-field X-ray detector with the opening of the pre-object collimator; and
      iv) moving the object of interest on the nonplanar trajectory within the field of view during an image acquisition.

2. The stationary-source CT system of claim 1, wherein the beam of X-ray photons is a narrow beam.

3. The stationary-source CT system of claim 2, wherein the narrow beam of X-ray photons is a horizontal narrow beam with a fan angle at least an order of magnitude larger than a cone angle or a vertical narrow beam with a cone angle at least an order of magnitude larger than a fan angle.

4. The stationary-source CT system of claim 1, wherein the narrow-field X-ray detector comprises an X-ray sensitive area that is at least an order of magnitude narrower in a first dimension versus a second dimension perpendicular to the first dimension.

5. The stationary-source CT system of claim 1, further comprising a chassis and wherein one or more of: the stationary X-ray source, the pre-object collimator, the narrow-field X-ray detector, and the structure configured to articulate the position of the object of interest are affixed, directly or indirectly, to the chassis.

6. The stationary-source CT system of claim 1, wherein the structure is configured to articulate the position of the object of interest and move the object of interest with two or three translational degrees of freedom and two or three rotational degrees of freedom.

7. The stationary-source CT system of claim 1, comprising a plurality of pre-object collimators and a plurality of narrow-field X-ray detectors, each pre-object collimator corresponding to a narrow-field X-ray detector, and wherein the operations comprise synchronizing a speed and a phase for the oscillatory translation of each corresponding collimator/detector pair.

8. The stationary-source CT system of claim 1, wherein the beam of X-ray photons incident on the narrow-field X-ray detector comprises less than 5% scattered photons.

9. A method of performing computed tomography (CT) to image an object of interest comprising:
   a) generating, at a stationary X-ray source, a beam of X-ray photons;
   b) oscillating an opening of a pre-object collimator, the pre-object collimator positioned between the stationary X-ray source and an object of interest, the opening configured to oscillate on a first translational arc having a first center of oscillation, and the oscillation on the first translational arc having less than 360 degrees rotation;
   c) oscillating a narrow-field X-ray detector, the narrow-field X-ray detector configured to oscillate on a second translational arc having a second center of oscillation, and the oscillation on the second translational arc having less than 360 degrees rotation;
   d) synchronizing a speed and a phase for the oscillatory translation of the narrow-field X-ray detector with the opening of the pre-object collimator;
   e) positioning of the object of interest between the pre-object collimator and the narrow-field X-ray detector within a field of view; and
   f) moving the object of interest on a nonplanar trajectory during an image acquisition;
      wherein the first translational arc and the second translational arc have parallel axes of rotation;

wherein:

$$\frac{R_1}{D_1} = \frac{R_2}{D_2}$$

when:
- $D_1$ is a distance of the stationary X-ray source from the first center of oscillation,
- $R_1$ is a distance of the opening of the pre-object collimator from the first center of oscillation,
- $R_2$ is a distance of the narrow-field X-ray detector from the second center of oscillation, and
- $D_2$ is a distance of the stationary X-ray source from the second center of oscillation.

10. The method of claim 9, wherein the beam of X-ray photons is a narrow beam.

11. The method of claim 10, wherein the narrow beam of X-ray photons is a horizontal narrow beam with a fan angle at least an order of magnitude larger than a cone angle or a vertical narrow beam with a cone angle at least an order of magnitude larger than a fan angle.

12. The method of claim 9, wherein the narrow-field X-ray detector comprises an X-ray sensitive area that is at least an order of magnitude narrower in a first dimension versus a second dimension perpendicular to the first dimension.

13. The method of claim 9, further comprising a chassis and wherein one or more of: the stationary X-ray source, the pre-object collimator, and the narrow-field X-ray detector are affixed, directly or indirectly, to the chassis.

14. The method of claim 9, utilizing a plurality of pre-object collimators and a plurality of narrow-field X-ray detectors, each pre-object collimator corresponding to a narrow-field X-ray detector, and wherein the method further comprises synchronizing a speed and a phase for the oscillatory translation of each corresponding collimator/detector pair.

15. The method of claim 9, wherein the positioning and the moving the object of interest is with two or three translational degrees of freedom and two or three rotational degrees of freedom.

16. The method of claim 9, wherein the beam of X-ray photons incident on the narrow-field X-ray detector comprises less than 5% scattered photons.

17. A stationary-source and stationary-detector computed tomography (CT) system comprising:
   a) a stationary X-ray source configured to generate a beam of X-ray photons;
   b) a pre-object collimator positioned between the stationary X-ray source and an object of interest and comprising an opening configured to oscillate on a first translational arc having a first center of oscillation;
   c) a stationary wide-field X-ray detector configured to acquire X-ray photons;
   d) a post-object collimator positioned between the object of interest and the stationary wide-field X-ray detector, comprising an opening configured to oscillate on a second translational arc having a second center of oscillation;
   wherein the first translational arc and the second translational arc have parallel axes of rotation;
   wherein:

$$\frac{R_1}{D_1} = \frac{R_2}{D_2}$$

when:
- $D_1$ is a distance of the stationary X-ray source from the first center of oscillation,
- $R_1$ is a distance of the opening of the pre-object collimator from the first center of oscillation,
- $R_2$ is a distance of the opening of the post-object collimator from the second center of oscillation, and
- $D_2$ is a distance of the stationary X-ray source from the second center of oscillation;

e) a structure configured to articulate the position of the object of interest between the pre-object collimator and the post-object collimator within a field of view and move the object of interest on a nonplanar trajectory; and
   f) a controller configured to perform at least the following operations:
      i) oscillating the opening of the pre-object collimator on the first translational arc with less than 360 degrees rotation;
      ii) oscillating the opening of the post-object collimator on the second translational arc with less than 360 degrees rotation;
      iii) synchronizing a speed and a phase for the oscillatory translation of the opening of the post-object collimator with the opening of the pre-object collimator; and
      iv) moving the object of interest on the nonplanar trajectory within the field of view during an image acquisition.

18. The stationary-source and stationary-detector CT system of claim 17, wherein the beam of X-ray photons is a narrow beam.

19. The stationary-source and stationary-detector CT system of claim 18, wherein the narrow beam of X-ray photons is a horizontal narrow beam with a fan angle at least an order of magnitude larger than a cone angle or a vertical narrow beam with a cone angle at least an order of magnitude larger than a fan angle.

20. The stationary-source and stationary-detector CT system of claim 17, further comprising a chassis and wherein one or more of: the stationary X-ray source, the pre-object collimator, the post-object collimator, and the wide-field X-ray detector, and the structure configured to articulate the position of the object of interest are affixed, directly or indirectly, to the chassis.

21. The stationary-source and stationary-detector CT system of claim 17, comprising a plurality of pre-object collimators and a plurality of post-object collimators, each pre-object collimator corresponding to a post-object collimator, and wherein the operations comprise synchronizing a speed and a phase for the oscillatory translation of each corresponding collimator pair.

22. The stationary-source and stationary-detector CT system of claim 17, wherein the structure is configured to articulate the position of the object of interest and move the object of interest with two or three translational degrees of freedom and two or three rotational degrees of freedom.

23. The stationary-source and stationary-detector CT system of claim 17, wherein the beam of X-ray photons incident on the wide-field X-ray detector comprises less than 5% scattered photons.

24. A method of performing computed tomography (CT) to image an object of interest comprising:
   a) generating, at a stationary X-ray source, a beam of X-ray photons;

b) oscillating an opening of a pre-object collimator, the pre-object collimator positioned between the stationary X-ray source and an object of interest, the opening configured to oscillate on a first translational arc having a first center of oscillation, and the oscillation on the first translational arc having less than 360 degrees rotation;

c) oscillating an opening of a post-object collimator, the post-object collimator positioned between the object of interest and a stationary wide-field X-ray detector, the opening configured to oscillate on a second translational arc having a second center of oscillation, and the oscillation on the second translational arc having less than 360 degrees rotation;

d) synchronizing a speed and a phase for the oscillatory translation of the opening of the post-object collimator with the opening of the pre-object collimator;

e) positioning the object of interest between the pre-object collimator and the and the post-object collimator within a field of view; and f) moving the object of interest on a nonplanar trajectory during an image acquisition;

wherein the first translational arc and the second translational arc have parallel axes of rotation;

wherein:

$$\frac{R_1}{D_1} = \frac{R_2}{D_2}$$

when:

$D_1$ is a distance of the stationary X-ray source from the first center of oscillation, $R_1$ is a distance of the opening of the pre-object collimator from the first center of oscillation, $R_2$ is a distance of the opening of the post-object collimator from the second center of oscillation, and $D_2$ is a distance of the stationary X-ray source from the second center of oscillation.

25. The method of claim 24, wherein the beam of X-ray photons is a narrow beam.

26. The method of claim 25, wherein the narrow beam of X-ray photons is a horizontal narrow beam with a fan angle at least an order of magnitude larger than a cone angle or a vertical narrow beam with a cone angle at least an order of magnitude larger than a fan angle.

27. The method of claim 24, wherein one or more of: the stationary X-ray source, the pre-object collimator, post-object collimator, and the wide-field X-ray detector, are affixed, directly or indirectly, to a chassis.

28. The method of claim 24, utilizing a plurality of pre-object collimators and a plurality of post-object collimators, each pre-object collimator corresponding to a post-object collimator, and wherein the method further comprises synchronizing a speed and a phase for the oscillatory translation of each corresponding collimator pair.

29. The method of claim 24, wherein the positioning and the moving the object of interest is with two or three translational degrees of freedom and two or three rotational degrees of freedom.

30. The method of claim 24, wherein the beam of X-ray photons incident on the narrow-field X-ray detector comprises less than 5% scattered photons.

* * * * *